United States Patent
Demiryurek et al.

(10) Patent No.: US 11,715,369 B2
(45) Date of Patent: Aug. 1, 2023

(54) LATENT SPACE MODEL FOR ROAD NETWORKS TO PREDICT TIME-VARYING TRAFFIC

(71) Applicant: UNIVERSITY OF SOUTHERN CALIFORNIA, Los Angeles, CA (US)

(72) Inventors: Ugur Demiryurek, Los Angeles, CA (US); Dingxiong Deng, Los Angeles, CA (US); Cyrus Shahabi, Los Angeles, CA (US); Linhong Zhu, Los Angeles, CA (US); Rose Yu, Los Angeles, CA (US); Yan Liu, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 511 days.

(21) Appl. No.: 16/326,138

(22) PCT Filed: Aug. 14, 2017

(86) PCT No.: PCT/US2017/046813
§ 371 (c)(1),
(2) Date: Feb. 15, 2019

(87) PCT Pub. No.: WO2018/035058
PCT Pub. Date: Feb. 22, 2018

(65) Prior Publication Data
US 2019/0180612 A1 Jun. 13, 2019

Related U.S. Application Data

(60) Provisional application No. 62/375,367, filed on Aug. 15, 2016.

(51) Int. Cl.
*G08G 1/01* (2006.01)
*G06N 20/00* (2019.01)
(Continued)

(52) U.S. Cl.
CPC ........... *G08G 1/0125* (2013.01); *G01C 21/20* (2013.01); *G01C 21/3691* (2013.01); *G06N 5/04* (2013.01);
(Continued)

(58) Field of Classification Search
CPC .... G08G 1/0125; G08G 1/0116; G08G 1/012; G08G 1/0129; G08G 1/0133; G08G 1/02;
(Continued)

(56) References Cited

U.S. PATENT DOCUMENTS

2006/0004511 A1\* 1/2006 Yoshikawa ...... G08G 1/096827
701/532
2008/0071465 A1\* 3/2008 Chapman ............. G08G 1/0104
701/117

(Continued)

OTHER PUBLICATIONS

Deng et al. "Latent Space Model for Road Networks to Predict Time-Varying Traffic." In: Cornell University Library; Social and Information Networks, Jul. 21, 2016;[online] [Retrieved on Feb. 24, 2021] Retrieved from the internet <URL: http://arxiv-export-lb.library.cornell.edu/abs/1602.0430> (Year: 2016).\*

(Continued)

*Primary Examiner* — Maceeh Anwari
*Assistant Examiner* — Charles Pall
(74) *Attorney, Agent, or Firm* — Snell & Wilmer LLP

(57) ABSTRACT

A method for traffic prediction of a road network includes receiving past traffic information corresponding to multiple locations on the road network. The method further includes determining, by a processor and based on the past traffic information, temporal characteristics of the past traffic information corresponding to changes of characteristics over time and spatial characteristics of the past traffic information corresponding to interactions between locations on the road network. The method further includes predicting predicted traffic information corresponding to a later time based on the
(Continued)

determined temporal and spatial characteristics of the past traffic information. The method further includes receiving detected additional traffic information corresponding to the later time. The method further includes updating the temporal characteristics of the traffic information and the spatial characteristics of the traffic information based on the predicted traffic information and the detected additional traffic information.

17 Claims, 11 Drawing Sheets

(51) Int. Cl.
| | |
|---|---|
| *G01C 21/20* | (2006.01) |
| *G01C 21/36* | (2006.01) |
| *G06N 5/04* | (2023.01) |
| *G08G 1/02* | (2006.01) |
| *G08G 1/0968* | (2006.01) |

(52) U.S. Cl.
CPC ............ *G06N 20/00* (2019.01); *G08G 1/012* (2013.01); *G08G 1/0116* (2013.01); *G08G 1/0129* (2013.01); *G08G 1/0133* (2013.01); *G08G 1/02* (2013.01); *G08G 1/096833* (2013.01)

(58) Field of Classification Search
CPC .... G08G 1/096833; G06N 20/00; G06N 5/04; G01C 21/20; G01C 21/3691
See application file for complete search history.

(56) References Cited

U.S. PATENT DOCUMENTS

| | | | |
|---|---|---|---|
| 2009/0043486 A1* | 2/2009 | Yang | G01C 21/3492 701/117 |
| 2011/0106416 A1* | 5/2011 | Scofield | G08G 1/0104 701/119 |
| 2012/0084747 A1* | 4/2012 | Chakradhar | G06F 9/5066 717/104 |
| 2014/0114556 A1 | 4/2014 | Pan et al. | |
| 2016/0314686 A1* | 10/2016 | Shi | G08G 1/0125 |
| 2017/0300049 A1* | 10/2017 | Seally | G08G 1/202 |

OTHER PUBLICATIONS

C. Pasquale, D. Anghinolfi, S. Sacone, S. Siri and M. Papageorgiou, "A comparative analysis of solution algorithms for nonlinear freeway traffic control problems," 2016 IEEE 19th International Conference on Intelligent Transportation Systems (ITSC), 2016, pp. 1773-1778, doi: 10.1109/ITSC.2016.7795798. (Year: 2016).*

International Search Report and Written Opinion of the International Searching Authority (dated Nov. 6, 2017) for Corresponding International PCT Patent Application No. PCT/US17/46813, filed Aug. 14, 2017.

Deng et al., "Latent Space Model for Road Networks to Predict Time-Varying Traffic," In: Cornell University Library; Social and Information Networks (cs.SI); Databases (cs,DB), Jul. 21, 2016 [online] [retrieved on Oct. 12, 2017 (Oct. 12, 2017)] Retrieved from the Internet,<URL: https://arxiv.org.abs/1602.04301v3>, entire document, especially Abstract; pp. 1-7.

* cited by examiner

LATENT SPACE MODEL FOR ROAD NETWORKS TO PREDICT TIME-VARYING TRAFFIC

CROSS REFERENCE TO RELATED APPLICATIONS

This application claims the benefit and priority of U.S. Provisional Application No. 62/375,367, entitled "LATENT SPACE MODEL FOR ROAD NETWORKS TO PREDICT TIME-VARYING TRAFFIC," filed on Aug. 15, 2016, the entire disclosure of which is hereby incorporated by reference herein in its entirety.

GOVERNMENT RIGHTS STATEMENT

This invention was made with Government support under contract IIS-1115153 awarded by the National Science Foundation (NSF). The Government has certain rights in this invention.

BACKGROUND

Traffic information corresponding to traffic on roadways is used to solve various problems. For example, traffic information may be used by governments to determine which road segments have problematic amounts of traffic at various times. These governments may use this information to determine optimal locations for installing new roads. Traffic information may also be used by navigation devices. For example, navigation devices may determine routes from a starting location to a destination based on current traffic levels on the road segments between the starting location and the destination. However, no systems or methods exist for accurately predicting traffic information for a future point in time.

Some research has been conducted to address the traffic prediction problem, but no single study so far has tackled all the challenges of traffic prediction. Some of the issues that the previous attempts failed to solve include the occasional failure of one or more sensor to provide data, the lack of sensors at certain locations along the road network, and the like. These models fail to predict traffic information on road segments from which no data is received, and some may entirely fail when one or more sensor fails to provide data or sensors are not installed on various segments of the road network. Additionally, these models may be relatively computationally expensive and time-consuming, thus precluding real-time traffic forecasting. Some previous attempts to predict traffic patterns include making predictions based on GPS data from moving vehicles. Such GPS data may be relatively inaccurate and thus may affect the entire prediction model.

Thus, there is a need in the art for systems and methods for accurate and relatively fast prediction of future traffic information.

SUMMARY

Described herein are methods for predicting traffic for a road network. The methods can be used to predict traffic under both periodic events, such as rush hours, and non-periodic events, such as inclement weather or accidents. The methods predict traffic based on both changes in traffic information over time at the same location as well as changes in traffic between locations. The specific implementation of the methods provides for relatively accurate prediction when data points are spaced apart by a relatively large distance but are correlated on the road network, and when data from specific points may be unobtainable (such as if a sensor becomes defective).

In particular, a method includes receiving past traffic information from a plurality of sensors placed at multiple locations on the road network. The traffic information may include a quantity of vehicles traveling over the portion of the road over a period of time and a speed of vehicles (which may be derived based on the quantity of vehicles). The past traffic information may include data collected from the sensors over a period of time. For example, the past traffic information may include data collected by each of the sensors every minute for a previous two weeks.

The method also includes determining temporal characteristics of the past traffic information and spatial characteristics of the past traffic information by a processor. Each of these characteristics are determined based on the past traffic information. In particular, the temporal characteristics of the past traffic information correspond to changes of characteristics of at least some of the multiple locations over a period of time. The spatial characteristics of the past traffic information correspond to changes in traffic behavior between different locations on the road network.

After the characteristics have been determined, a processor may predict predicted traffic information based on the determined characteristics. Predicting the traffic information based on both temporal and spatial characteristics provides a relatively high accuracy of traffic prediction. The predicted traffic information corresponds to traffic information at a predetermined time in the future (i.e., a later time).

Because the model represents spatial characteristics, traffic can be predicted for roadway locations that may not be associated with detected data. This beneficially allows for relatively high accuracy of prediction even when sensors are spaced apart by a relatively large distance (e.g., 1-2 miles apart) and/or when sensors have become damaged or inoperable.

After the predetermined time has elapsed, the sensors can detect additional traffic information that corresponds to traffic information at the multiple locations on the road network at the later time. The processor can then compare the predicted traffic information to the detected additional traffic information and update the characteristics of the traffic information based on the comparison. This allows for constant updating and improvement of the model of the road network characteristics. The updating of the spatial and temporal characteristics may be performed using a combination of global learning and incremental learning.

The method may also include representing the road network using multiple vertices and edges. The vertices may indicate an intersection or an end of a road. The edges may correspond to segments of road that link the vertices.

Also described is a system for predicting traffic of a road network. The system includes a plurality of sensors positioned at multiple locations on the road network and designed to detect past traffic information. The system also includes a network access device designed to receive the past traffic information from the plurality of sensors. The system also includes a prediction processor coupled to the network access device. The prediction processor is designed to determine temporal characteristics of the past traffic information corresponding to changes of characteristics of at least some of the multiple locations on the road network over time, and spatial characteristics of the past traffic information corresponding to interactions between at least some of the multiple locations on the road network. The prediction processor is further designed to predict predicted traffic information corresponding to a later time based on the determined temporal characteristics of the past traffic information and the determined spatial characteristics of the past traffic information. The prediction processor is further designed to receive detected additional traffic information corresponding to the later time for at least some of the multiple locations on the road network. The prediction processor is further designed to update the temporal characteristics of the traffic information and the spatial characteristics of the traffic information based on the predicted traffic information and the detected additional traffic information.

Also described is a method for traffic prediction of a road network. The method includes receiving, from a plurality of sensors, past traffic information corresponding to multiple locations on the road network. The method further includes determining, by a processor and based on the past traffic information, temporal characteristics of the past traffic information corresponding to changes of characteristics of at least some of the multiple locations on the road network over time, and spatial characteristics of the past traffic information corresponding to interactions between at least some of the multiple locations on the road network. The method further includes predicting, by the processor, predicted traffic information corresponding to traffic information at locations other than those associated with sensors at a later time based on the determined temporal characteristics of the past traffic information and the determined spatial characteristics of the past traffic information by performing matrix operations. The method further includes receiving, from the plurality of sensors, detected additional traffic information corresponding to the later time for at least some of the multiple locations on the road network. The method further includes updating, by the processor, the temporal characteristics of the traffic information and the spatial characteristics of the traffic information based on the predicted traffic information and the detected additional traffic information.

BRIEF DESCRIPTION OF THE DRAWINGS

Other systems, methods, features, and advantages of the present invention will be or will become apparent to one of ordinary skill in the art upon examination of the following figures and detailed description. Additional figures are provided in the accompanying Appendix and described therein.

DETAILED DESCRIPTION

Figure 1:
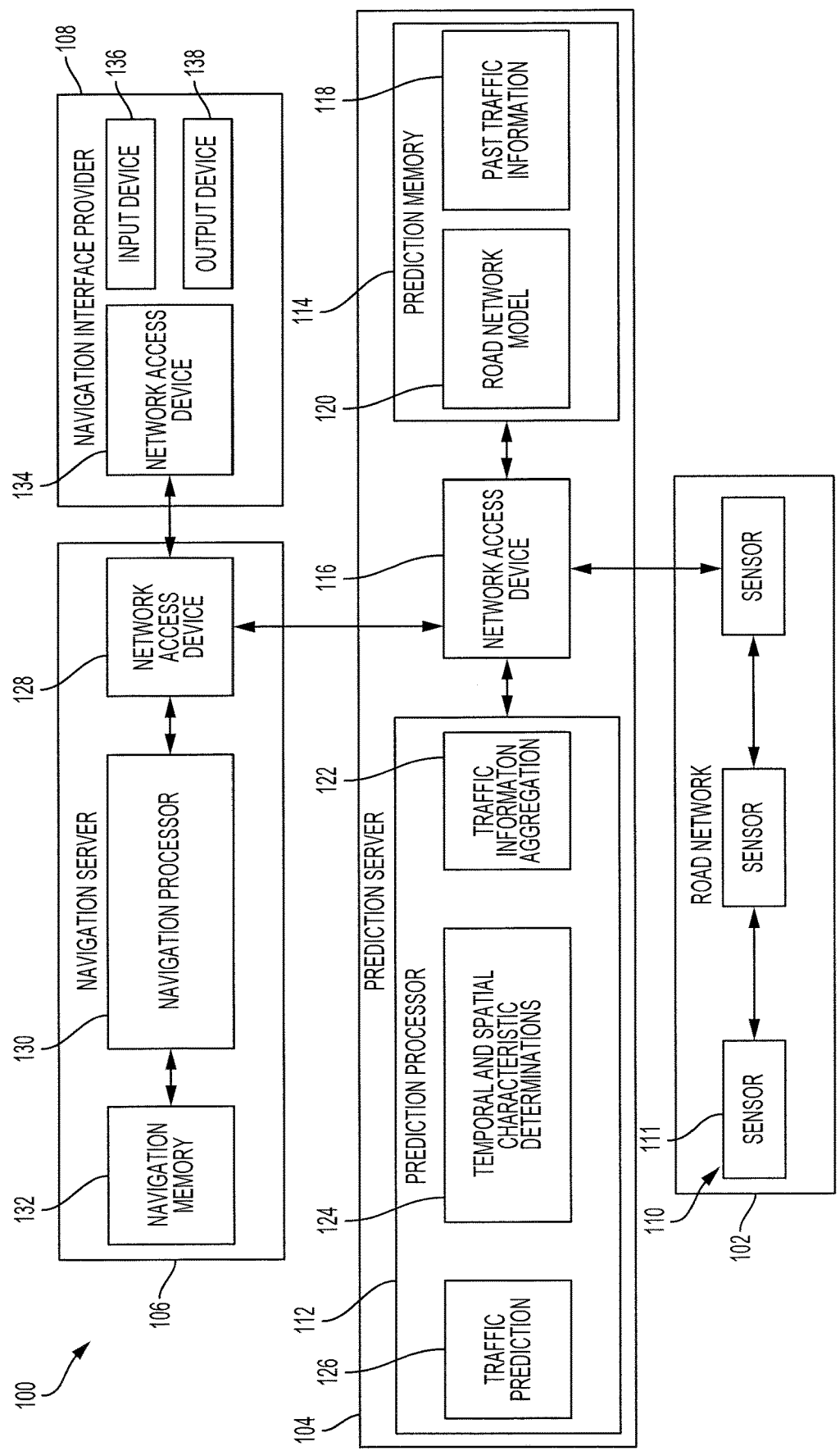
FIG. 1 is a block illustrating a system for predicting future traffic information and for utilizing the predicted future traffic information according to an embodiment of the present disclosure.

The present disclosure discusses traffic prediction using Latent Space Modeling for Road Networks (LSM-RN), which enables more accurate and scalable traffic prediction by utilizing latent attributes corresponding to both topology similarity and temporal correlations. Specifically, with LSM-RN, vertices of dynamic road networks are embedded into a latent space, where two vertices that are similar in terms of both time-series traffic behavior and the road network topology are close to each other in the latent space.

Latent Space Modeling has been successfully applied to several real-world problems, including social networks (LSM-SN). However, none of the approaches to LSM-SN are suitable for both identifying the edge or sensor latent attributes in road networks and exploiting them for real-time traffic prediction for various reasons.

First, road networks show significant topological (spatial, i.e., travel speeds between two sensors on the same road segment are similar), and temporal (e.g., travel-speeds measured every 1 minute on a particular sensor are similar) correlations. These correlations can be exploited to alleviate the problem of data missing from various segments of the roadway, which is unique to road networks, due to the fact that some road segments may contain no sensors and any sensor may occasionally fail to report data. Furthermore, unlike social networks, LSM-RN is relatively fast evolving due to time varying traffic conditions. On the contrary, social networks evolve smoothly and frequent changes are relatively unlikely. Conversely, traffic conditions on a particular road segment of a road network can change rapidly in a relatively short amount of time due to changes between rush hour and non-rush hours, along with traffic incidents. Additionally, LSM-RN is relatively dynamic due to new data being received in a streaming fashion, as opposed to social networks which are relatively static. Due to this dynamic nature, frequent model updates may be utilized with LSM-RN. Such frequent model updates may necessitate partial updates of the model as opposed to time-consuming full updates utilized in LSM-SN. Furthermore, the ground truth can be observed shortly after making a prediction (by measuring the actual speed of the road segment) which provides an opportunity for incremental improvement to the model.

Using the LSM-RN model, each dimension of the latent space may represent a latent attribute. The underlying traffic pattern may be determined based on the attribute distribution of vertices and how the attributes interact with each other. To enforce the topology of the road network, the LSM-RN model adds a graph Laplacian constraint which enables global graph similarity and can be used to complete missing data by a set of similar edges with non-zero readings. These temporal properties are incorporated in the LSM-RN model by considering time-dependent latent attributes and a global transition process, thus enabling improved modeling of traffic pattern formation and evolution.

In order to infer time-dependent latent attributes of the LSM-RN model, a method may include utilizing multiplicative algorithms based on non-negative matrix factorization where the whole latent attributes may be jointly inferred via iterative updates until they become stable (i.e., global learning). However, global learning may be relatively slow and impractical for real-time traffic prediction. This is due to the relatively high fidelity of traffic data and the fact that the actual ground truth of traffic speed may become available relatively quickly after the prediction. Thus, instead of global learning, the time-dependent latent attributes of the LSM-RN model are inferred using an incremental online learning in which the latent attributes are sequentially and adaptively learned from the temporal traffic changes. In particular, each time the present algorithm makes a prediction with latent attributes learned from a previous snapshot, the algorithm receives feedback from the next snapshot (i.e., the detected ground truth speed reading) and subsequently modifies the latent attributes for increased accuracy of predictions. Unlike traditional online learning which only performs a single update per round, the goal of the present learning is to make predictions for the entire road network, and thus the proposed online algorithm allows simultaneous updates to latent attributes of many correlated vertices.

The LSM-RN model may strike a balance between accuracy and efficiency for real-time forecasting by lever aging both global and incremental learning algorithms. Specifically, a setting may be considered with a predefined time window where the traffic model is learned at each time window with the proposed incremental inference approach on the fly, and predictions may be made for the next time period. The time window may be, for example, 1 minute, 5 minutes, 10 minutes, or the like. Meanwhile, the re-computation of the traffic model may be matched at the end of a relatively large time window (i.e., such as 1 hour). Using this setting, the LSM-RN model enables the following two properties. First, real-time feedback information may be seamlessly incorporated into the framework to adjust for existing latent spaces, thus allowing for increased accuracy of predictions. Additionally, the algorithms perform training and predictions on the fly with a relatively small amount of data rather than requiring training that is based on large data sets.

Extensive experiments were conducted on a large scale using real-world traffic sensor data. The experiments demonstrated that the LSM-RN framework achieves higher accuracy than existing time series methods and the LSM-SN approaches. The experiments further illustrated that the LSM-RN framework scales to large road networks. For example, a prediction may be made for a network with 19,986 edges in only 4 seconds. The experiments also showed that the batch window setting works well for streaming data (i.e., alternating the executions of global and incremental algorithms) which strikes a balance between prediction accuracy and efficiency. For example, incremental learning may be one order of magnitude faster than global learning, and it may require less than one second to incorporate real-time feedback information.

Referring now to FIG. 1, a system 100 for predicting and utilizing traffic information corresponding to a road network is shown. The system 100 includes a road network 102, a prediction server 104, a navigation server 106, and a navigation interface provider 108.

The road network may include a plurality of road segments, which may be referred to as edges, and a plurality of intersections or dead ends, which may be referred to as vertices. A plurality of sensors 110 may be positioned along the road network 102. For example, the sensors 110 may be positioned along an edge or at a vertex of the road network. The sensors 110 may include any type of sensor capable of detecting traffic information. For example, each of the sensors 110 may include a traffic loop sensor, an optical sensor, a camera, a line of sight sensor, or a global positioning system (GPS) sensor. Each of the sensors 110 may detect data such as a volume of vehicles on a given road segment (i.e., a quantity of vehicles that passes a given sensor in a predetermined amount of time), an occupancy of vehicles on the road segment (i.e., a percent of time in which a vehicle is positioned over the given sensor in a predetermined amount of time), or a speed of traffic along the road segment. In some embodiments, the speed may be determined based on the detected volume and occupancy.

The prediction server 104 may include a server specifically designed to perform computation-heavy matrix operations and to analyze received traffic data and make traffic predictions based on the analysis. The prediction server 104 may include a prediction processor 112, a prediction memory 114, and a network access device 116.

The network access device 116 may include any device or combination of devices capable of transmitting or receiving data from an electronic component that is separate from the prediction server 104. For example, the network access device 116 may communicate via a wired or wireless interface such as Ethernet, Wi-Fi, Bluetooth, a cellular protocol (such as 4G), or the like. The network access device 116 may receive traffic information from each of the plurality of sensors 110. The network access device 116 may further communicate with the navigation server 106.

The prediction memory 114 may include any non-transitory memory capable of storing data. For example, the prediction memory 114 may store instructions usable by the prediction processor 112 to perform operations. The prediction memory 114 may further store past traffic information 118 that is received from the sensors 110 along with a road network model 120. The past traffic information 118 may include, for example, a volume of vehicles, and occupancy of vehicles, or a speed of traffic along a given road segment. The road network model 120 may include a model of the road network which may be represented by a plurality of vertices and edges.

The prediction processor 122 may include one or more processors or controllers, which may be specifically designed for traffic data analysis and traffic prediction. In that regard, the prediction processor 122 may be capable of receiving the past traffic information 118 and the road network model 120, determining temporal and spatial characteristics of the past traffic information 118, and making a prediction of future traffic conditions based on the temporal and spatial characteristics.

The prediction processor 112 may perform various functions. In some embodiments, each function may be performed by a separate and dedicated piece of hardware. In some embodiments, each function may be performed by a single multifunction piece of hardware. The functions may include traffic information aggregation 122, temporal and spatial characteristic determinations 124, and traffic prediction 126.

The traffic information received from the sensors 110 may include a constant flow of data. In that regard, the traffic information aggregation function 122 may determine aggregated past traffic information by averaging the traffic information over a predetermined time interval for each of the plurality of sensors. For example, a first sensor 111 may detect and output multiple traffic speeds. The traffic information aggregation function 122 may receive the multiple traffic speeds and may take an average of the multiple traffic speeds over a predetermined period of time, such as 30 seconds, to determine the aggregated past traffic information. In some embodiments, each of the sensors 110 may include a logic device that can determine the aggregated past traffic information such that the aggregated past traffic information is provided to the network access device 116 via the sensors 110.

As mentioned above, the prediction processor 122 may determine latent characteristics of the road network 102 based on the past traffic information 118. In that regard, the temporal and spatial characteristic determinations function 124 may determine such characteristics. For example, the temporal and spatial characteristic determinations function 124 may determine the characteristics by performing matrix operations using the past traffic information 118 and the road network model 120. In some embodiments, the temporal and spatial characteristic determinations function 124 may continuously or periodically update at least one of the road network model 120, the temporal characteristics, or the spatial characteristics as new data is received from the sensors 110.

The traffic prediction function 126 may predict future traffic information for one or more edge or vertex of the road network based on the most recent determined temporal and spatial characteristics of the past traffic information 118.

The navigation server 106 may be capable of receiving the predicted future traffic information and determining navigation routes based on the predicted future traffic information. The navigation interface provider 108 may receive a navigation request from a user, may provide the navigation request to the navigation server 106, may receive one or more navigation route from the navigation server 106, and may output navigation instructions based on the one or more navigation route.

In particular, the navigation server 106 includes a network access device 128, a navigation processor 130, and a navigation memory 132. The network access device 128 may include any network access device including those described above with reference to the network access device 116 of the prediction server 104. In that regard, the network access device 128 may receive the predicted future traffic information from the prediction server 104. In some embodiments, the network access device 128 may further receive current traffic information from the prediction server 104. The network access device 128 may further receive the navigation request from the navigation interface provider 108. The navigation request may include a starting location and a destination.

The navigation memory 132 may include information corresponding to the road network. For example, the information may include map data which may be used to determine navigation routes from a starting location to a destination.

The navigation processor 130 may receive the predicted future traffic information from the network access device 128 and may determine a navigation route from the starting location to the destination based on the predicted future traffic information and the map data stored in the navigation memory 132. In particular, the navigation processor 130 may determine a navigation route based on a desire to minimize travel time from the starting location to the destination. In some embodiments, the navigation processor 130 may continuously or periodically receive updated predicted future traffic information and may update the determined navigation route based on the updated predicted future traffic information.

The navigation interface provider 108 may include any device capable of receiving input data, transmitting the input data to a remote device, and providing output data. For example, the navigation interface provider 108 may include a GPS unit, a mobile telephone, a tablet, a laptop, or the like. The navigation interface provider 108 may include a network access device 134, an input device 136, and an output device 138. The network access device 134 may include any network access device such as those described above with reference to the network access device 116 of the prediction server 104. The network access device 134 may receive the determined navigation route from the navigation server 106. In some embodiments, the network access device 134 may receive updates to the determined navigation route based on the updated predicted future traffic information.

The input device 136 may include any input device capable of receiving a current location of the navigation interface provider 108 or a starting location of a route, if different from the current location. For example, the input device 136 may include a keyboard, a touchscreen, a microphone, a button, or the like. The input device 136 may also receive a desired destination.

The output device 138 may include any output device capable of outputting navigation instructions. For example, the output device 138 may include a touchscreen, a display, a speaker, or the like.

Figure 2:
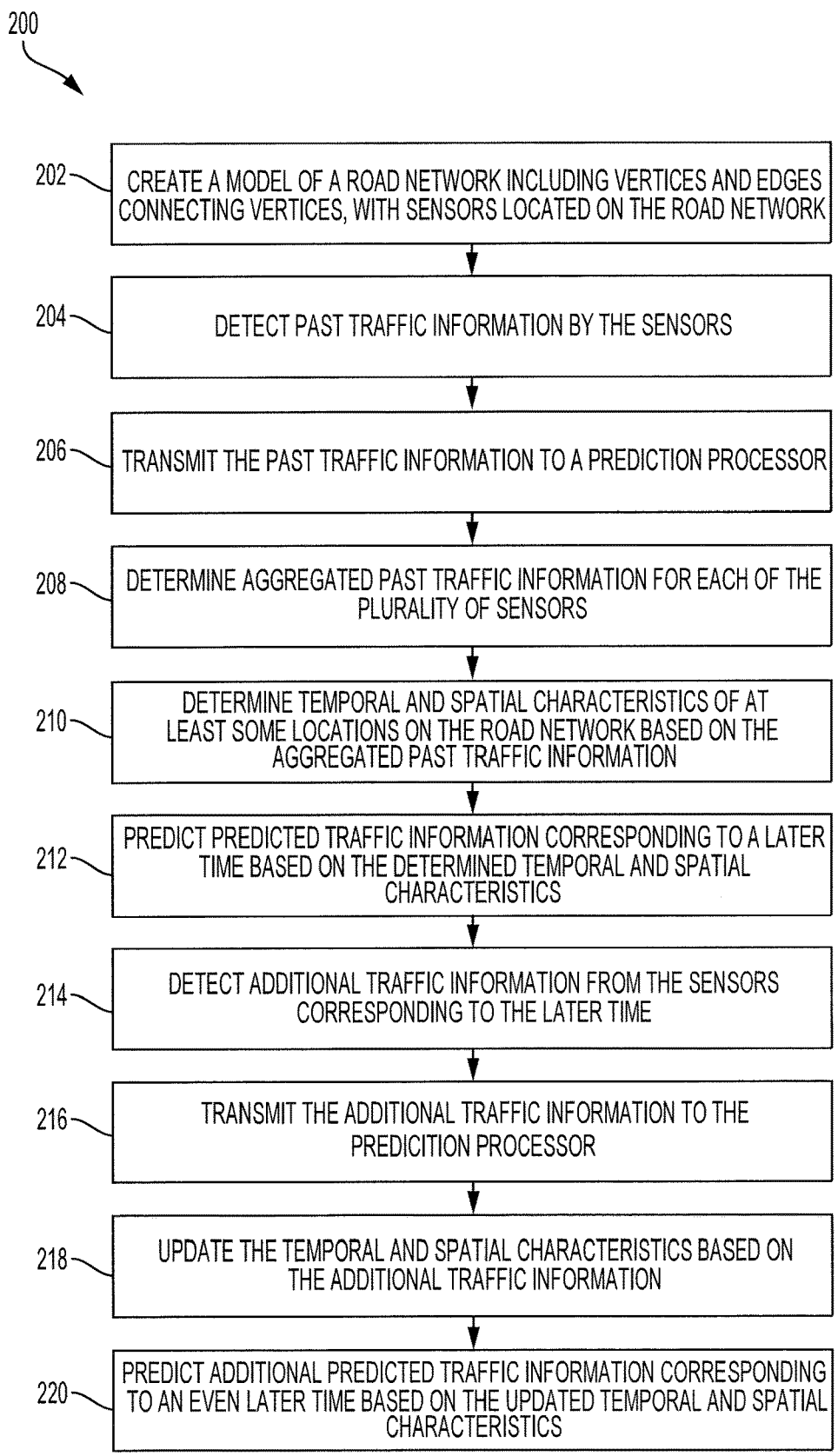
FIG. 2 is a flowchart illustrating a method for predicting future traffic information according to an embodiment of the present disclosure.

Turning now to FIG. 2, a method 200 for predicting traffic information corresponding to a road network is provided. The method 200 may be performed by components of a system similar to the system 100 of FIG. 1.

In block 202, a model of the road network may be created. The model may be, for example, a latent space model (LSM). The road network model may be created automatically by a prediction server based on the map data corresponding to the road network. In some embodiments, the road network model may be created based on the location of sensors within the road network. The road network model may represent the road network using multiple vertices and multiple edges connecting the vertices. The vertices may correspond to intersections, dead ends, or the like. The edges may represent road segments. In some embodiments, the edges may be represented as a single direction road segment such that a two-way road may be represented by two single-directional edges. The road network model may further include the location of sensors located on the road network. For example, the sensors may be located on edges and the road network model may include the location of each sensor on the corresponding edge.

In block 204, the sensors positioned on the road network may detect past traffic information. For example and as described above, the past traffic information may include a speed of vehicles on the corresponding edge, a volume of vehicles on the corresponding edge, an occupancy of vehicles on the corresponding edge, or the like.

In block 206, the past traffic information detected by the sensors of the road network may be transmitted to a prediction processor of the prediction server. For example, the sensors may include a network access device that automatically transmits the past traffic information to the prediction server. In some embodiments, one or more processor located along the road network may receive the past traffic information from each of the sensors and may transmit, via a network access device, the past traffic information to the prediction server.

In block 208, the prediction processor may determine aggregated past traffic information for each of the plurality of sensors. In some embodiments and as described above, the prediction processor may determine the aggregated past traffic information or the sensors themselves may determine the aggregated past traffic information. In some embodiments, one or more processor located along the road network may determine the aggregated past traffic information and may transmit the aggregated past traffic information to the prediction processor.

In block 210, the prediction processor may determine temporal and spatial characteristics of at least some locations on the road network. These characteristics may be determined based on the aggregated past traffic information. For example, the aggregated past traffic information may be organized in a matrix format. Matrix operations may be performed using the aggregated past traffic matrix to determine each of the temporal and spatial characteristics of the road network.

In block 212, the prediction processor may predict predicted traffic information corresponding to traffic on at least a portion of the road network at a future point in time. For example, the predicted traffic information may include a prediction of a vehicle speed, a vehicle density, a vehicle occupancy, or the like on a given segment at a point in time (such as 5 minutes in the future, 10 minutes in the future, 30 minutes in the future, or the like). The prediction of the predicted traffic information may be calculated based on the temporal and spatial characteristics determined in block 210. For example, additional matrix operations may be performed using the temporal and spatial characteristic matrices to calculate the predicted traffic information.

In block 214, the sensors on the road network may detect additional traffic information. The additional traffic information may correspond to a later point in time than the past traffic information. In block 216, the additional traffic information may be transmitted to the prediction processor.

In block 218, the temporal and spatial characteristics of the road network may be updated based on the additional traffic information by the prediction processor. For example, the characteristics may be updated by performing matrix operations based on the previous temporal and spatial characteristics as well as the additional traffic information. The characteristics may be updated using a combination of global learning and incremental learning. Global learning may provide a greater accuracy of the updates but may require a relatively large amount of time to complete. Conversely, incremental learning may be performed relatively quickly but may be less accurate than global learning. By combining global learning with incremental learning, the updates to the characteristics may be calculated relatively quickly (i.e., may be quicker than global learning alone) and may be relatively accurate (i.e., may have a greater accuracy than incremental learning alone).

In block 220, the prediction processor may predict additional predicted traffic information corresponding to an even later time than the original predicted traffic information. The prediction of the additional predicted traffic information may be based on the updated temporal and spatial characteristics of the road network. Because the characteristics are continuously or periodically updated, the accuracy of the characteristics may continuously improve. In that regard, the additional predicted traffic information may have a greater accuracy than the original predicted traffic information.

Figure 3:
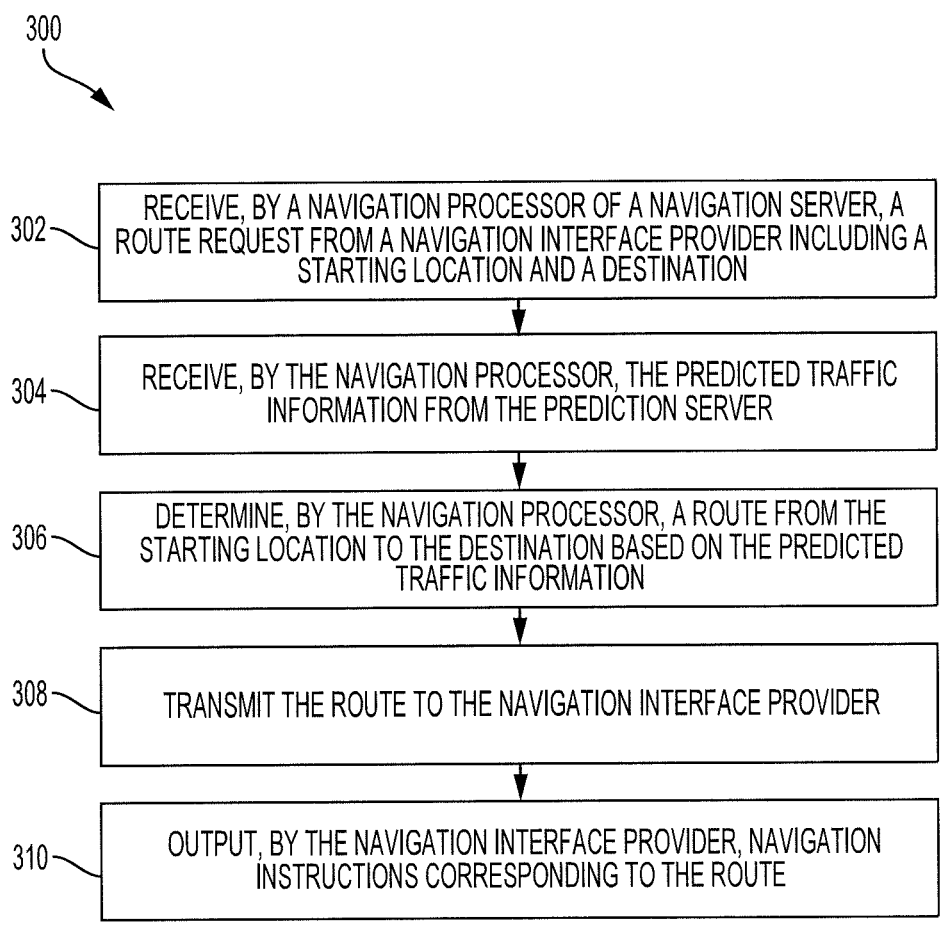
FIG. 3 is a flowchart illustrating a method for utilizing predicted future traffic information according to an embodiment of the present disclosure.

Referring now to FIG. 3, a method 300 for utilizing predicted traffic information, such as predicted traffic information predicted using the method 200 of FIG. 2, is shown. The steps of the method 300 may be performed using components of a system similar to the system 100 of FIG. 1.

In block 302, a navigation server may receive a route request from a navigation interface provider. For example, a user may request navigation directions via an input device of the navigation interface provider. The request may include a starting location and a destination. In some embodiments, the request may include additional preferences such as whether the user prefers a quickest route, a shortest route, or the like. The navigation interface provider may create and transmit a route request to the navigation server that includes the starting location, the destination, and optionally additional preferences.

In block 304, the navigation server may receive the predicted traffic information from the prediction server. In some embodiments, the navigation server may continuously receive predicted traffic information from a prediction server and, in some embodiments, the prediction server may transmit the predicted traffic information to the navigation server upon request from the navigation server.

In block 306, the navigation processor may determine a route from the starting location to the destination. The route may be determined based on the starting location, the destination, and the predicted traffic information. For example, the navigation processor may analyze all potential routes from the starting location to the destination, including predicted traffic information along the routes, and determine an optimal route based on factors such as whether the user prefers a quickest route, a shortest route, or the like.

In block 308, the navigation server may transmit the determined optimal route to the navigation interface provider. For example, the route may include a list of consecutive route segments that the navigation interface provider may follow to reach the destination from the starting location.

In block 310, the navigation interface provider may determine navigation instructions from the starting location to the destination using the received route. For example, the navigation interface provider may output instructions including a length of the current route segment before a turn is to be made, instructions as to when and where the navigation interface provider should turn, and the like.

In some embodiments, the navigation server may update the route as new current and predicted traffic information is received. The navigation server may, for example, determine a new route that may result in a reduced total trip time. If an updated route is determined, the navigation server may transmit the updated route to the navigation interface provider.

Returning reference to FIG. 1, the prediction processor 112 may model a road network using latent space modeling (LSM) with time varying latent space. The traffic speed of a road segment may be predicted based on the latent attributes and the interaction between corresponding attributes. To tackle the sparsity of sensor data on a road network, graph topology may be utilized by adding a graph Laplacian constraint to impute missing values. Additionally, the latent position of each vertex may vary over time and may allow for sudden movement from one timestamp to another timestamp via a transition matrix.

In the following description of an exemplary implementation of the method 200 of FIG. 2, various notations are used. The following is a brief description of some of the notations: N refers to a road network; n refers to a quantity of vertices of the road network; G refers to an adjacency matrix of a graph; U refers to a latent space matrix; B refers to an attribute interaction matrix; A refers to a transition matrix; k refers to a quantity of dimensions of latent attributes; T refers to a quantity of snapshots; span refers to a gap between two continuous graph snapshots; H refers to a prediction horizon; λ refers to a regularization parameter for a graph Laplacian process; and γ refers to regularization parameters for a transition process. Of note is that latent attributes and latent positions are used interchangeably due to the fact that each dimension of a latent space represents a latent attribute.

A road network may be denoted as a directed graph N=(V, E), where V is the set of vertices and E∈V×V is the set of edges, respectively. A vertex $v_i \in V$ models a road intersection or an end of road. An edge $e(v_i, v_j)$, which connects two vertices, represents a directed road segment (i.e., two edges may exist between a pair of nodes; a first edge may correspond to travel from node A to node B, and a second edge may correspond to travel from node B to node A). Each edge e(v) is associated with a travel speed c(v) (e.g. 40 miles per hour). In addition, N has a corresponding adjacency matrix representation, denoted as G, whose $(i, j)^{th}$ entry represents the edge weight between the $i^{th}$ and $j^{th}$ vertices.

Snapshots of the road network may be constructed from a relatively large scale and high-resolution traffic sensor data set. Specifically, a sensor s (such as a loop detector) may be located at one segment of the road network N, which provides a reading (e.g. 40 miles per hour) per sampling rate (e.g. 1 minute). One day may be divided into multiple intervals, where span is the length of each time interval. For example, when span equals 5 minutes, each day may include 288 time intervals. For each time interval t, the readings of each sensor may be aggregated (i.e., averaged). Subsequently, for each edge segment of the network N, all sensor readings located at that edge are averaged to determine the weight of the edge segment. Therefore, at each timestamp t, a road network snapshot $G_t$ may be created from the traffic sensors.

Figures 4A, 4B, 5A, 5B:
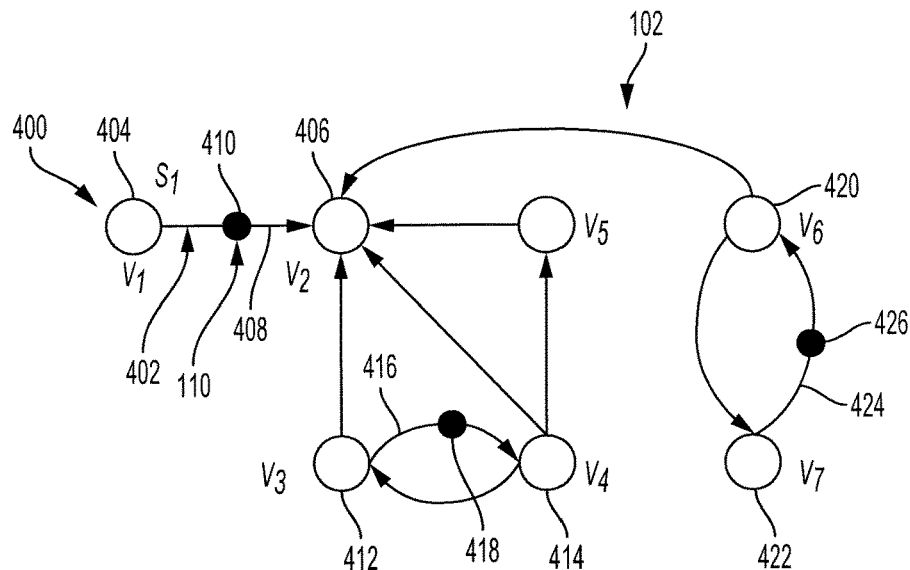
FIG. 4A is a drawing illustrating an exemplary model of a road network according to an embodiment of the present disclosure.
FIG. 4B is a matrix that represents a snapshot of the road network of FIG. 4A at a specific point in time according to an embodiment of the present disclosure.
FIG. 5A illustrates a matrix model that represents a traffic model of a road network according to an embodiment of the present disclosure.
FIG. 5B illustrates an exemplary implementation of the matrix model of FIG. 5A at a specific point in time according to an embodiment of the present disclosure.

Referring now to FIG. 4A, the road network 102 is shown to have 7 vertices 400 and 10 edges 402. Three sensors 110 may be located on edges. For example, a first sensor 410 may be located at a first edge 408 between a first vertex 404 and a second vertex 406. A second sensor 426 may be located on a third edge 424 between a sixth vertex 420 and a seventh vertex 422. A third sensor 418 may be located along a second edge 416 between a third vertex 412 and a fourth vertex 414. Each of the sensors 110 may provide an aggregated reading during a given time interval.

Referring to FIGS. 4A and 4B, an adjacency matrix (G) 450 that corresponds to the road network 102 is shown. The adjacency matrix 450 includes the sensor readings that are mapped to the corresponding edges 402. Of note is the fact that the sensor dataset is incomplete with both missing values (i.e., the third sensor 418 fails to provide a value) and missing sensors (i.e., sensors are not positioned on certain edges 402, as indicated by the character x).

Given a relatively small number of road network snapshots, or a dynamic road network, the objective is to predict future traffic conditions. Specifically, a dynamic road network includes a sequence of snapshots $(G_1, G_2, \ldots G_T)$ with edge weights denoting time-dependent travel speeds.

With a dynamic road network, the problem of edge traffic prediction with missing data may be formally defined as follows:

Problem 1: Given a dynamic road network $(G_1, G_2, \ldots G_T)$ with missing data at each timestamp, the aim is to achieve the following two goals:
complete the missing data (i.e., both missing values from existing sensors and missing sensors on certain edges) of $G_i$ where $1 \leq i \leq T$; and
predict the future readings of $G_{T+h}$, where h is the prediction horizon. For example, when h=1, the traffic condition of $G_{T+1}$ is predicted at the next timestamp.

The LSM-RN model of traffic prediction will now be described in detail. In particular, the traffic model is built upon a latent space model of an observed road network. Each vertex of a road network may have different attributes, and each vertex may have an overlapping representation of attributes. The attributes of vertices and the interaction between vertices may jointly be used to determine the underlying traffic pattern. Intuitively $A = \pi r^2$, if two highway vertices are connected, their corresponding interaction may generate a higher travel speed than that of two vertices located at arterial streets. In particular, given a snapshot of the road network G, the aim is to learn to matrices U and B, where matrix $U \in R_+^{n \times k}$ denotes latent attributes of vertices, and matrix $B \in R_+^{k \times k}$ denotes attribute interaction patterns. The product of $U \times BU^T$ represents the traffic speed between any two vertices, and may be used to approximate G. B may be an asymmetric matrix because the road network G is directed. Therefore, a basic traffic model which considers the graph topology may be determined by solving the following optimization problem represented below in equation 1:

$$\operatorname*{argmin}_{U \geq 0, B \geq 0} J = \|G - U\ BU^T\|_F^2 \qquad (\text{eq. 1})$$

Referring now to FIG. 5A, an exemplary matrix model 500 represents the intuition of the static traffic model. As shown, the G matrix corresponds to the U matrix multiplied by the B matrix and the transposed U matrix. As described above, the G matrix represents the road network, the U matrix represents the attributes of vertices in the road network, n represents the quantity of nodes, k represents the quantity of attributes, and the B matrix denotes the interaction between types of attributes.

FIG. 5B illustrates a representation 550 of the matrix model 500 using the values from the edge from $V_1$ to $V_2$ from the adjacency matrix 450 of FIG. 4B. The representation is based on an assumption that each vertex is associated with two attributes (e.g., a highway area and business area), and the interaction pattern between the two attributes is encoded in matrix B. Using this information, the travel speed from $v_1$ to $v_2$ may be accurately estimated using their latent attributes and the B matrix. In particular, the value 28.6 corresponds to the value detected by the first sensor 410.

In the road network, the G matrix may be relatively sparse (i.e., zero-entries dominate the locations in the G matrix) for various reasons. The reasons may include the fact that an average degree of a road network may be relatively small, and thus the edges of the road network may be far from fully connected. The reasons may also include that the distribution of sensors is non-uniform, such that only a relatively small quantity of edges are equipped with sensors. The reasons may also include that missing values may exist (for edges that are equipped with sensors) due to at least one of sensor failure or maintenance being performed on the sensors.

Accordingly, the loss function may be defined only on edges with observed reading (i.e., the set of edges with a travel cost $c(v_i, v_j) > 0$. Additionally, an in-filling method is proposed to reduce a gap between the input road network and the estimated road network. Graph Laplacian dynamics are considered, which may be an effective smoothing approach for finding global structure similarity. Specifically, a graph Laplacian matrix L is constructed and defined as $L=D-W$. W is a graph proximity matrix that is constructed from the network topology, and D is a diagonal matrix that satisfies $D_{ii}=\Sigma_j(W_{ij})$. With these new constraints, the traffic model for one snapshot of the road network G may be expressed as follows in equation 2:

$$\operatorname*{argmin}_{U,B} J = \|Y \odot (G - U\ BU^T)\|_F^2 + \lambda Tr(U^T LU), \qquad (\text{eq. 2})$$

In equation 2, Y is an indication matrix for all non-zero entries in G (i.e., $Y_{ij}=1$ if and only if $G(i,j)>0$). $\odot$ represents a Hadamard product operator (i.e., $(X \odot Z)_{ij}=X_{ij} \times Z_{ij}$. $\lambda$ represents the Laplacian regularization parameter.

Temporal information, including time-dependent modeling of latent attributes and the temporal transition, will be incorporated. Using this model, each vertex is represented in a unified latent space, where each dimension either represents a spatial attribute (characteristic) or a temporal attribute (characteristic).

The behavior of vertices of a road networks may evolve relatively quickly. For example, the behavior of a vertex that is similar to that of a highway vertex during normal traffic condition may become similar to that of an arterial street node during hours of relatively heavy traffic congestion. Because the behavior of each vertex may change over time, it may be advantageous to use time-dependent modeling for attributes of vertices for real-time traffic prediction. Therefore, the time-dependent effect of attributes may be added into the traffic model. Specifically, for each $t \leq T$, the aim is to learn a corresponding time-dependent latent attribute representation $U_t$. Although the latent attribute matrix $U_t$ is time-dependent, an assumption may be made that the attribute interaction matrix B is an inherent property, and thus may be fixed for all timestamps. By incorporating such a temporal effect, the model may be obtained based on the optimization problem illustrated in equation 3:

$$\operatorname*{argmin}_{U_t, B} J = \sum_{t=1}^{T} \|Y_t \odot (G_t - U_t BU_t^T)\|_F^2 + \sum_{t=1}^{T} \lambda Tr(U_t LU_t^T) \qquad (\text{eq. 3})$$

Due to the dynamics of traffic conditions, the present disclosure aims to learn not only the time-dependent latent attributes, but also a transition model that captures the evolving behavior from one snapshot to the next. The transition may capture both periodic evolving patterns (e.g. morning and afternoon rush hours) and nonrecurring patterns caused by traffic incidents (e.g. accidents, road construction, or works zone closures). For example, during the interval of an accident, a vertex may transition from a normal state to a congested state at the beginning, then become normal again after the accident is cleared.

Thus, a global process may be assumed to capture the state transitions. Specifically, a matrix A may be used that approximates the changes of U between time $t-1$ to time t (i.e., $U_t=U_{t-1}A$, where $U \in R_+^{k \times k}$, $A \in R_+^{k \times k}$). The transition matrix A represents the likelihood of a vertex transitioning from the attribute i to the attribute j from timestamp 1 to timestamp T.

Considering the above discussion, a final objective function for the LSM-RN model may be defined as shown in equation 4:

$$\arg\min J = \Sigma_{t=1}^T \|Y_t \odot (G_t - U_t BU_t^T)\|_F^2 + \Sigma_{t=1}^T \lambda Tr(U_t LU_t^T) + \Sigma_{t=1}^T \gamma \|U_t - U_{t-1}A\|_F^2 \qquad (\text{eq. 4})$$

In equation 4, $\lambda$ and $\gamma$ are regularization parameters.

By solving equation 4, the matrices, $U_t$, B, and A may be obtained from the LSM-RN model. Consequently, the task of completing both missing values and missing sensors can be accomplished using equation 5:

$$G_t = U_t BU_t^T, \text{ when } 1 \leq t \leq T \qquad (\text{eq. 5})$$

Subsequently, the edge traffic for a snapshot $G_{T+h}$ (where h corresponds to a quantity of future time spans) may be predicted using equation 6:

$$G_{T+h} = (U_t A^h) B (U_t A^h)^T \qquad (\text{eq. 6})$$

Next, a typical global multiplicative algorithm may be used to infer the LSM-RN model, and then a fast incremental algorithm may be utilized to scale to a relatively large road network.

An iterative update algorithm may be utilized to solve equation 4, which may correspond to a multiplicative update algorithm. The update rules of $U_t$, B, and A are shown below in equations 7, 8, and 9:

$$(U_t) \leftarrow$$ (eq. 7)

$$(U_t) \odot \left( \frac{(Y_t \odot G)(U_t B^t + U_t B) + \lambda W U_t + \gamma(U_{t-1} A + U_{t+1} A^T)}{(Y_t \odot U_t B U_t^T)(U_t B^T + U_t B) + \lambda D U_t + \gamma(U_t + U_t A A^T)} \right)^{\frac{1}{4}}$$

$$B \leftarrow B \odot \frac{\sum_{t=1}^{T} U_t^T (Y_t \odot G_t) U_t}{\sum_{t=1}^{T} U_t^T (Y_t \odot (U_t B U_t^T)) U_t}$$ (eq. 8)

$$A \leftarrow A \odot \left( \frac{\sum_{t=1}^{T} U_{t-1}^T U_t}{\sum_{t=1}^{T} U_{t-1}^T U_{t-1} A} \right)$$ (eq. 9)

Algorithm 1 (presented in pseudo-code), shown below, outlines the process for updating each matrix using the aforementioned multiplicative rules to optimize equation 4. The general concept is to jointly infer and cyclically update each of the latent attribute matrices $U_t$, B, and A. In particular, the latent attributes may be jointly learned for each time t from all of the graph snapshots (lines 3 and 4 of algorithm 1). Based on the sequence of time-dependent latent attributes (i.e., $U_1$, $U_2$, . . . $U_t$) the global attribute interaction pattern be and the transition matrix A are learned (lines 5 and 6 of algorithm 1).

---
Algorithm 1 Global-learning ($G_1$, $G_2$, . . . $G_t$)
---

Input: graph matrix $G_1$, $G_2$, ... $G_t$.
Output: $U_t$ ($1 \le t \le T$), A and B.
{
1:        Initialize $U_t$, B and A
2:        while Not Convergent do
3:          for t = 1 to T do
4:            update $U_t$ according to Eq. 7
5:            update B according to Eq. 8
6:            update A according to Eq. 9
}

---

When the latent attribute of one vertex $U_{t-1}$ is updated, the spatial property may be preserved by considering the latent positions of its adjacent vertices ($Y_t \odot G_t$) and by incorporating the local graph Laplacian constraint (i.e., matrix W and matrix D). Additionally, the temporal property of one vertex may be captured by lever aging its latent attribute in the previous timestamp and the next timestamp (i.e., $U_{t-1}(i)$ and $U_{t+1}(i)$, as well as the transition matrix.

In each iteration of algorithm 1, the computation may be dominated by matrix multiplication operations. Therefore, the worst-case time complexity per iteration is dominated by $O(T(nk^2+n^2k))$. In practice, a low ranking latent space representation may be chosen, where k is a relatively small number (e.g. 20). In terms of convergence, it can be proven that algorithm 1 converges into a local minimum, and the objective value is non-increasing during each iteration.

Next, an incremental learning algorithm will be described. The intuition behind the incremental algorithm is based on the observation that each time a prediction is made for a subsequent period of time (e.g. 5 minutes), the ground truth reading will be available immediately after the period of time. This provides motivation to adjust the latent position of each vertex so that the prediction is closer to the ground truth. On the other hand, it may be unnecessary to perform the latent position adjustment for each vertex. This is because during a short time interval, the overall traffic condition of the whole network tends to stay steady, and the travel cost of most edges changes at a relatively slow pace, although certain vertices may go through obvious variations. Therefore, instead of re-computing the latent positions of all the vertices from scratch at every timestamp, a "lazy" update may be performed. In particular, to learn the latent space $U_t$, the incremental algorithm may utilize the latent space that has already been learned in the previous snapshot (i.e., $U_{t-1}$), may make predictions for the next snapshot (i.e., $G_t$), and then may conditionally adjust latent attributes of a subset of vertices based on the changes of the traffic condition.

Algorithm 2 represents the incremental learning algorithm using pseudocode. Initially, the latent space of $U_1$ may be learned using the global multiplicative algorithm (line 1). With the learned latent matrix $U_{t-1}$, at each timestamp t between 2 and T, the incremental update consists of the following two components. First, candidate vertices may be identified based on feedback (lines 3-8). Next, the latent attributes of the candidate vertices may be updated and the adjustment may be propagated from one vertex to its neighbor (line 9). As outlined in algorithm 2, given $U_{t-1}$ and $G_t$, an estimation of $\widehat{G_t}$ is made based on $U_{t-1}$ (line 3). Subsequently, $G_t$ may be used as feedback information to select a set of vertices where inaccurate predictions were made. The inaccurate predictions may then be inserted into a candidate set cand (lines 4-8). Consequently, $U_t$ may be updated based on the learned latent matrix $U_{t-1}$, the ground truth observation $G_t$, and the candidate set cand (line 9). Afterwards, the global transition matrix A may be learned (line 10).

---
Algorithm 2 Incremental-Learning($G_1$, $G_2$, . . . $G_t$)
---

Input: graph matrix $G_1$, $G_2$, ... $G_t$.
Output: $U_t$ ($1 \le t \le T$), A and B.
{
1:    ($U_1$,B) ←Global-learning($G_1$)
2:    for t = 2 to T do
3:        $\widehat{G_t} \leftarrow U_{t-1} B U_{t-1}^T$ (prediction)
4:        cand ← ∅(a subset of vertices to be updated)
5:        for each i ∈ G do
6:            for each j ∈ out(i) do
7:                if$|G_t(i, j) - \widehat{G_t}(i, j)| \ge \delta$ then
8:                    cand ← cand ∪ {i, j}
9:        Ut ←Incremental-Update($U_{t-1}$,$G_t$, cand)
10:      Iteratively learn transition matrix A using eq. 9 until A converges
}

---

Given $U_{t-1}$ and $G_t$, $U_t$ may be incrementally calculated from $U_{t-1}$ with the candidate set cand, with which $G_t$ may be accurately approximated. At each round, the algorithm predicts an outcome for the required task (i.e., predicts the speed of edges). Once the algorithm makes a prediction, it receives feedback indicating the correct outcome. Next, the online algorithm may modify its prediction mechanism for better predictions on subsequent timestamps. In the present scenario, the latent attribute matrix $U_{t-1}$ may be used to predict $G_t$, as if the observation is unknown. Subsequently, the model of $U_t$ may be adjusted according to the true observation of $G_t$, which is known.

However, in this scenario, predictions are being made for the entire road network, not just for a single edge. When a prediction is made for one edge, the latent attributes of two vertices require adjustment. However, to make a prediction for an entire road network, the latent attributes should be updated for many correlated vertices. Therefore, the effect of adjusting the latent attribute of one vertex may potentially affect its neighboring vertices, and may influence the convergence speed of incremental learning. Hence, the adjustment order of vertices may be important.

Algorithm 3 (presented in pseudo-code) presents details regarding updating $U_t$ from $U_{t-1}$. For each vertex i of cand, its latent position may be adjusted so that more accurate predictions may be made (line 7). Next, influence of this adjustment on the candidate task set may be examined from the following aspect. The first aspect is whether the latent attribute of i changes significantly, and if not, it may be removed from the set of cand (lines 8 and 9). The second aspect is if the adjustments of i also affect its neighbor j, vertex j may be added to cand (lines 10-13).

---

Algorithm 3 Incremental-Update($U_{t-1}$, $G_t$, cand)
Input: the latent matrix $U_{t-1}$, observed graph reading $G_t$,
    candidate set cand, hyper-parameters $\delta$ and $\tau$
Output: Updated latent space $U_t$
}
1:   $U_t \leftarrow U_{t-1}$
2:   while Not Convergent AND cand $\not\subseteq \emptyset$ do
3:       order cand from the reverse topological order
4:       for i $\in$ cand do
5:           oldu $\leftarrow U_t(i)$
6:           for each j $\in$ out(i) do
7:               adjust $U_t(i)$ using Eq. 11
8:               if $\|U_t(i) - oldu\|_F^2 \leq \tau$ then
9:                   cand $\leftarrow$ cand\ {i}
10:              for each j $\in$ out(i) do
11:                  p $\leftarrow U_t(i)BU_t(j)$
12:                  if $|p - G_t(i, j)| \geq \delta$ then
13:                      cand $\leftarrow$ cand $\cup$ {j}
}

---

The remaining questions and the incremental update algorithm include how to adjust the latent position of one vertex according to feedback, and how to decide the order of update. Each of these questions will now be addressed.

Figure 6A:
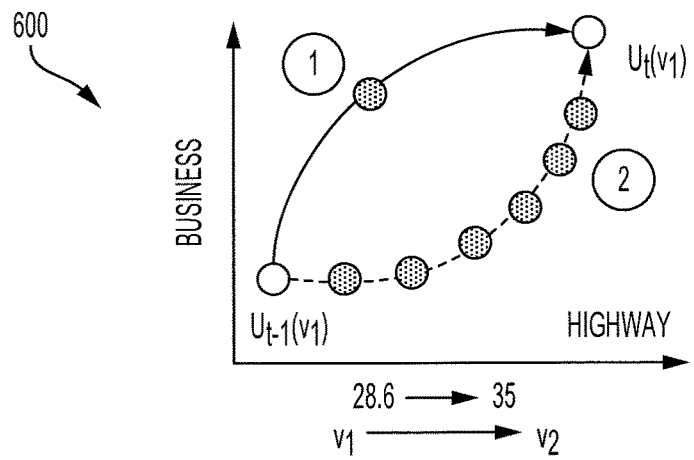
FIG. 6A is a graph illustrating adjustments to a latent attribute of a road network according to an embodiment of the present disclosure.

In order to achieve relatively high efficiency of adjustments to each latent attribute, this disclosure proposes making a relatively small change to the latent space (in a relatively quick manner) in order to predict the correct value. For example and referring to FIG. 6A, a chart 600 illustrates adjustments to the latent attribute $v_1$. A new latent position of $v_1$ may be known. Accordingly, it may be preferable to use fewer step movements when determining the actual latent position of $v_1$ rather than using gradual adjustments to determine the latent position of $v_1$ (although gradual adjustments may also provide the desired results). When the latent position of a vertex is moved to a new position, the objective of such movement may be to produce a correct prediction for each of its outgoing edges. Specifically, given $U_{t-1}(i)$, the desire is to find $U_t(i)$ which may accurately predict the weight of each edge $e(v_i, v_j)$ that is adjacent to the vertex $v_i$. The problem may thus be formulated as shown in equation 10:

$$U_t(i), \xi^* = \arg\min_{U(i) \in R_+^k} \frac{1}{2}\|U(i) - U_{t-2}(i)\|_F^2 + C\xi \qquad (eq.\ 10)$$

$$s.t.\ |U(i)BU^T(j) - G_t(i, j)| \leq \delta + \xi$$

In equation 10, $\xi$ is a non-negative slack variable, C>0 is a parameter which controls a trade-off between being conservative (i.e., making relatively small changes to the model) and corrective (satisfying the constraint), and $\delta$ is a precision parameter.

Of note is the fact that a non-negative constraint exists over the latent space $U_t(i)$. Thus, when the predicted value $\hat{y}_t$ (i.e., $U_t(i)BU_t^T(j)$) is less than the correct value $y_t$ (i.e., $G_t(I,j)$), a traditional online passive-aggressive algorithm may be used because it guarantees the non-negativity of U(i). Otherwise, U(i) may be updated by solving a quadratic optimization problem. The detailed solution is shown in equations 11 and 12:

$$U_t(i) = \max(U_{t-1}(i) + (k^* - \theta^*) \cdot BU_{t-1}(j)^T, 0) \qquad (eq.\ 11)$$

$k^*$ and $\theta^*$ may be computed as shown in equation 12:

$$\begin{cases} k^* = \alpha_t, \theta^* = 0 & \text{if } \hat{y}_t < y_t \\ k^* = 0, \theta^* = C & \text{if } \hat{y}_t > y_t \text{ and } f(C) \geq 0 \\ k^* = 0, \theta^* = f^{-1}(0) & \text{if } \hat{y}_t > y_t \text{ and } f(C) < 0 \end{cases} \qquad (eq.\ 12)$$

Where $$\alpha_t = \min\left(C, \frac{\max(|\hat{y}_t - y_t| - \delta, 0)}{\|BU_{t-1}(j)^T\|^2}\right)$$

$$f_t(\theta) = \max(U_t(i) - \theta BU_t(j)^T, 0) \cdot BU_t(j)^T - G_t(i, j) - \delta$$

As discussed above, the update order may be relatively important because it influences the convergence speed of the incremental algorithms. Referring to FIG. 4A, an initial candidate set cand of the road network 102 may include 3 vertices $v_7$, $v_6$, and $v_2$, which includes two edges $e(v_7, v_6)$ and $e(v_6, v_2)$. If the update sequence is randomly chosen as $<v_7, v_6, v_2>$ (i.e., the first adjustment is to the latent attribute of $v_7$) so that $c(v_7, v_6)$ has an accurate reading, the latent attribute of $v_6$ may be subsequently adjusted to correct the estimation of $c(v_6, v_2)$. Unfortunately, the adjustment to $v_6$ may influence the correction made to $v_7$, thus leading to an inaccurate estimation of $c(v_7, v_6)$. Accordingly, a desirable order may include updating vertex $v_6$ prior to updating $v_7$.

Figure 6B:
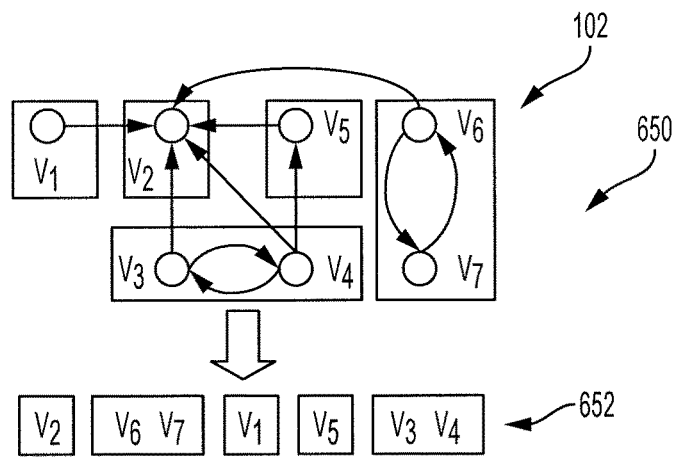
FIG. 6B is a illustrating showing the model of the road network of FIG. 4A along with an adjustment order corresponding to a desired order of vertices to be adjusted according to an embodiment of the present disclosure.

Accordingly, this disclosure proposes considering the reverse topology of the road network when updating the latent position of each candidate vertex i∈cand. The general principle is as follows: given edge $e(v_i, v_j)$, the update of vertex v, should proceed after the update of $v_j$ because the position of $v_i$ is dependent upon $v_j$. This provides motivation for deriving a reverse topological order in the graph of G. Unfortunately, the road network G is not a Directed Acyclic Graph (DAG) and contains cycles. To address this issue, a condensed super graph is generated where each Strongly Connected Component (SCC) of the graph G is contracted as a super node. Next, a reverse topological order is derived based on the condensed graph. For the vertex order and each SCC, an ordering of vertices inside each SCC is generated by random algorithms or heuristics. Referring now to FIG. 6B, an exemplary drawing illustrates the road network 102 and a desirable adjustment order 652 of the road network 102. Each rectangle of FIG. 6B represents a SCC. After generating a reverse topological order based on the contracted graph and randomly ordering the vertices within each SCC, a desirable final ordering $<v_2, v_6, v_7, v_1, v_5, v_4, v_3>$ is obtained. Each time the latent attributes of cand are updated, they are updated according to the final ordering.

For each vertex i, the computational complexity of adjusting its latent attributes using equation 11 is O(k), where k corresponds to the quantity of attributes. Therefore, to compute latent attributes u, the time complexity per iteration is $O(kT(\Delta_n+\Delta_m))$, where $\Delta_n$ corresponds to a quantity of candidate vertices in cand, and $\Delta_m$ corresponds to a total quantity of edges incident to the vertices in cand. In practice, $\Delta_n \ll \Delta n$, and $\Delta_m \ll m \ll n^2$. In addition, the SEC may be generated in linear time $O(m+n)$ via Tarjan's algorithm. Therefore, it may be concluded that the computational cost per iteration is significantly reduced using algorithm 2 relative to using the global learning approach.

Discussion will now turn to application of the learning algorithms to real-time traffic prediction, where sensor data (i.e., traffic information) is received in a streaming fashion. In practice, it may be too time-consuming to apply the global learning algorithm to all previous snapshots due to the heavy computation required. Moreover, it is not always the case that more snapshots will yield a better prediction performance. An alternative method includes treating each snapshot independently (i.e., each time the incremental learning algorithm is applied to the most recent snapshot, and then the learned latent attributes are used to predict the traffic condition). Obviously, this method may yield poor prediction quality as it ignores temporal transitions.

Figure 7:
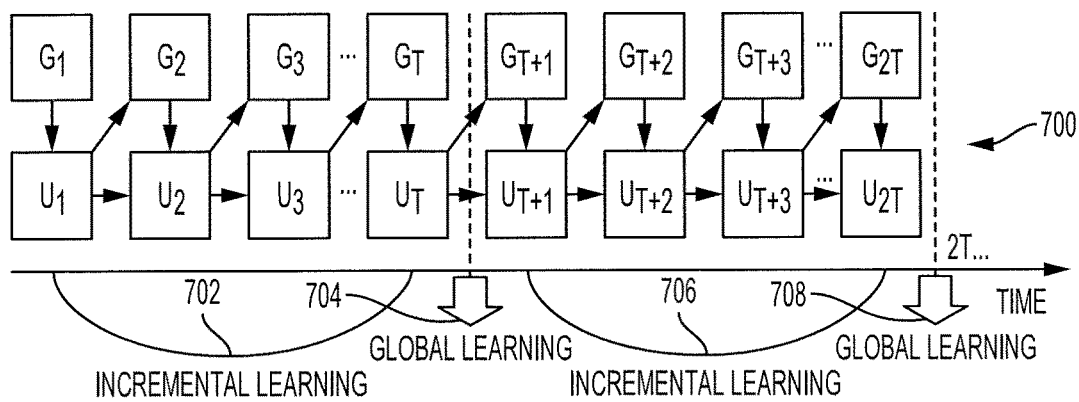
FIG. 7 is a diagram illustrating a batch window framework for real-time traffic prediction according to an embodiment of the present disclosure.

To achieve a desirable trade-off between the two methods described above, this disclosure proposes adapting a sliding window setting for learning of the LSM-RN model, where an incremental algorithm is applied at each timestamp during one window, and the global learning algorithm is run once at the end of each time window. Referring to FIG. 7, a batch window 700 illustrates the combination of incremental and global learning. In particular, incremental learning is performed during a first time window 702 between time t=0 and time t=T. Global learning is then applied at timestamp T 704 which corresponds to the end of the first time window. During global learning, the method learns the time-dependent latent attributes for the previous T timestamps. Subsequently, for each timestamp T+i between T 704 and 2T 708 (i.e., during the second time window 706), the incremental algorithm is applied to adjust the latent attributes and make further predictions (i.e., $U_{t+i}$ is used to predict the traffic of $G_{t+(i+1)}$). Each time the true observation of (i.e., the sensor data is received for) $G_{t+(i+1)}$, $U_{T+(i+1)}$ is calculated using the incremental learning of algorithm 3. The latent attributes $U_{2T}$ may be recomputed at timestamp 2T 708, and $U_{2T}$ may be used for the next time window [2T to 3T].

Discussion will now turn to experimentation and results using the systems and methods provided in the present disclosure. In particular, relatively large scale high-resolution (both spatial and temporal) traffic sensors (loop detectors) were used to collect a data set from highways and arterial streets in Los Angeles County. The dataset includes both inventory and real-time data for 15,000 traffic sensors covering approximately 3420 miles. The sampling rate of the data, which provides speed, volume, and occupancy, is one reading per sensor per minute. This data was collected continuously from 2010 until April 2014.

Figure 8:
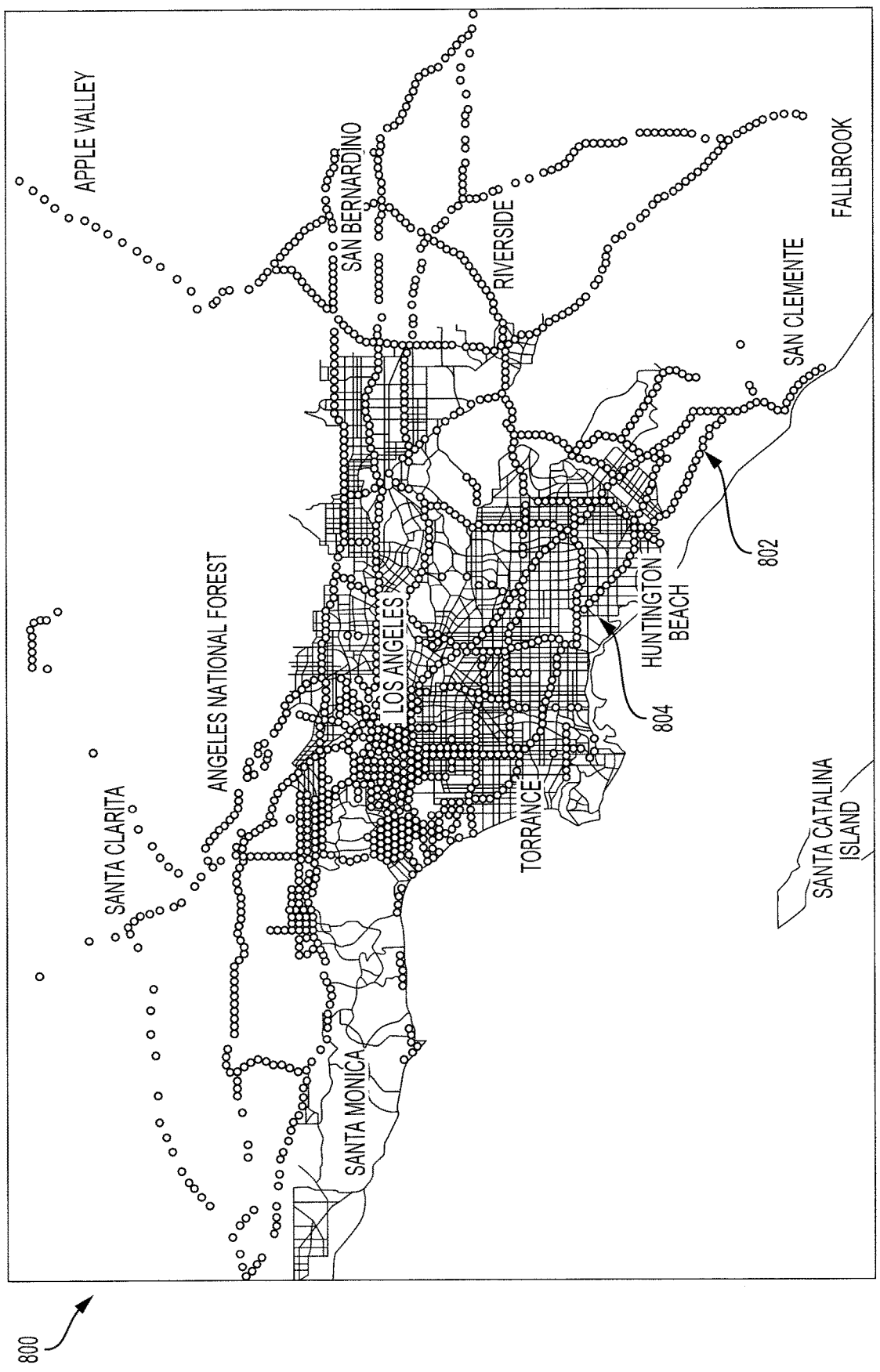
FIG. 8 is a drawing illustrating an exemplary layout of the road network including edges and sensors according to an embodiment of the present disclosure.

Sensor data between March 2014 and April 2014 was chosen for experimentation. This sensor data includes more than 60 million records of readings. The Los Angeles road network used in the experiment was obtained from HERE Map dataset. Two subgraphs were created of the Los Angeles road network, including a SMALL network and a LARGE network. The SMALL network contains 5984 vertices and 12,538 edges. 1642 sensors were mapped to the SMALL network. The LARGE network contains 8242 vertices and 19,986 edges. 4048 sensors were mapped to the LARGE network. FIG. 8 illustrates a low definition representation of sensor locations 802 and road network segments 804. After mapping the sensor data, two months of network snapshots were obtained for both the SMALL and the LARGE networks.

LSM-RN-All refers to the global learning algorithm described herein, and LSM-RN-Inc refers to the incremental learning algorithm described herein.

For edge traffic prediction, results are compared with LSM-RN-Naïve, in which the formulations from LSM-SN were adapted by combining the topology and temporal correlations. Additionally, LSM-RN-Naïve uses a Naïve incremental learning strategy which independently learns the latent attributes of each timestamp first, then learns the transition matrix. The algorithms are also compared with two representative timeseries prediction methods: a linear model (i.e., ARIMA) and a nonlinear model (i.e., SVR). Each model was trained independently for each timeseries using historical data. In addition, because the methods may be negatively affected due to missing values during the prediction stages (i.e., some of the input readings for ARIMA and SVR may be 0), ARIMA-Sp and SVR-Sp were considered. ARIMA-Sp and SVR-Sp use completed readings from the global learning algorithm to provide a fair comparison. The Tensor method was also implemented, however, this method cannot address the sparsity problem of the dataset and thus produces meaningless results (i.e., most of the prediction values are relatively close to 0).

For missing value completion, the algorithms were compared with two methods. The first is KNN which uses the average values of the nearby edges and Euclidean distance as the inputted value. The second is LSM-RN-Naive, which independently learns the latent attributes of each snapshot, then uses the learned latent attributes to approximate the edge readings.

To evaluate the performance of online prediction, the scenario of a batch window setting described above is considered. Considering a time window [0, 2T], the latent attributes of $U_T$ and transition matrix A are batch learned from [0, T]. Next, the traffic predictions are sequentially predicted for the timestamps during [T+1, 2T]. Each time a prediction is made, the true observations are received as feedback. The incremental algorithm of the present disclosure (LSM-RN-Inc) is compared with three baseline algorithms: Old, LSM-RN-Naïve and LSM-RN-All. Specifically, to predict $G_{t+1}$, LSM-RN-Inc utilizes the feedback of $G_{T+(i-1)}$ to adjust the time-dependent latent attributes of $U_{T+(i-1)}$. The Old algorithm fails to consider feedback data and always uses the latent attributes $U_T$ and the transition matrix A from the previous time window. On the other hand, LSM-RN-Naïve ignores the previous snapshots, and only applies the inference algorithm to the most recent snapshot $G_{T+(i-1)}$ (also referred to as a mini batch). LSM-RN-All applies the global learning algorithm consistently to all historic snapshots (i.e., $G_I$ to $G_{T+(i-1)}$ and then makes a prediction (also referred to as a full batch).

Two different time ranges were selected. One time range represents rush hour (i.e., 7 AM to 8 AM) and another time range represents non-rush hour (i.e., 2 PM to 3 PM), respectively. For the task of missing value completion, twenty percent (20%) of the values were selected as unobserved and were manipulated as missing during each timestamp of one range (e.g. rush hour) with the objective of completing those missing values. For each traffic prediction task at one particular timestamp (e.g. 7:30 AM), 20% of the values were randomly selected as unknown and used as ground truth values.

The parameter T, corresponding to the quantity of snapshots, and the parameter span, corresponding to a time gap between to continue snapshots, were both varied. The values of k, λ, and γ, which are parameters of the model, were also varied. The default settings, illustrated with bold and underlined font, of the experiment parameters are listed in table 2 below.

TABLE 2

| Parameters | Value Range |
| --- | --- |
| T | 2, 4, 6, 8, <u>10</u>, 12 |
| Span | 5, 10, 15, <u>20</u>, 25, 30 |
| K | 5, 10, 15, <u>20</u>, 25, 30 |
| λ | $2^{-7}, 2^{-5}, 2^{-3}, 2^{-1}, 2^{1}, \underline{\mathbf{2^{3}}}, 2^{5}$ |
| γ | $2^{-7}, \underline{\mathbf{2^{-5}}}, 2^{-3}, 2^{-1}, 2^{1}, 2^{3}, 2^{5}$ |

The results of varying γ are not reported as they are similar to the results of varying λ. Mean Absolute Percentage Error (MAPE) and Root Mean Square Error (RMSE) were used to measure the accuracy. The results provided below were measured using MAPE. In particular, MAPE is defined as follows in equation 13:

$$MAPE = \left( \frac{1}{N} \sum_{i=1}^{N} \left( \frac{|y_i - \hat{y_i}|}{y_i} \right) \right) \quad \text{(eq. 13)}$$

With ARIMA and SVR, the dataset of March was used to train a model for each edge, and a five-fold cross-validation was used to choose the optimal parameters. All tasks of missing value completion and edge traffic prediction were conducted using data from April. The experiments were conducted using C++ on a Linux PC with an i5-2400 CPU at 3.1 Gigahertz and 24 gigabits of memory.

Figure 9A:
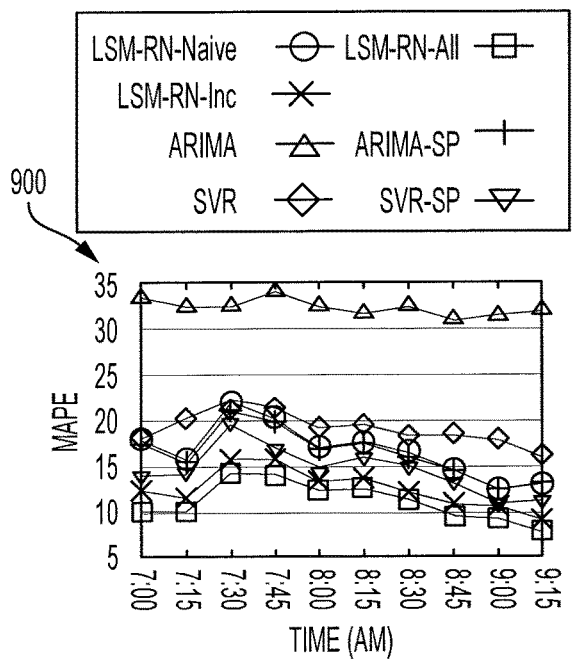
FIGS. 9A-9C are graphs illustrating prediction accuracy of various methods of predicting future traffic information for a relatively short prediction window according to an embodiment of the present disclosure.
Figure 9B:
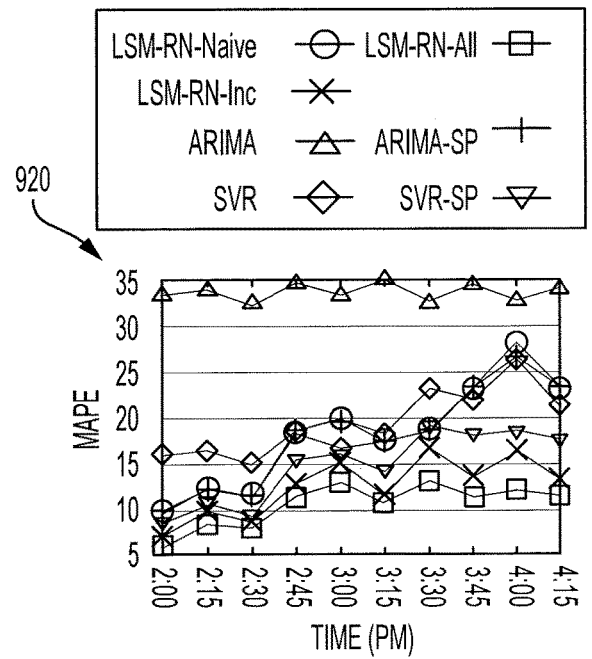

FIG. 9A illustrates results 900 of experimentation of the SMALL network during rush hour, and FIG. 9B illustrates results 920 of experimentation of the SMALL network during non-rush hour for predictions of 5 minutes in the future (i.e., h=1). As shown in FIGS. 9A and 9B, LSM-RN-All and LSM-RN-Inc achieve the best results, and LSM-RN-All performs slightly better than LSM-RN-Inc. These results demonstrate the effectiveness of using time-dependent latent attributes and the transition matrix. It can be observed that, without imputing missing values, time series prediction techniques (i.e., ARIMA and SVR) perform worse than LSM-RN-All and LSM-RN-Inc.

Meanwhile, the results also demonstrate that LSM-RN-Naive, which separately learns the latent attributes of each snapshot, fails to achieve the same quality of prediction as LSM-RN-All and LSM-RN-Inc. This indicates that simply combining topology and time is insufficient for obtaining accurate predictions. Even when utilizing completed readings, the accuracy of SVR-Sp and ARIMA-Sp is less than that of LSM-RN-All and LSM-RN-Inc. One reason for this result may include that simply combining spatial and temporal properties does not necessarily yield improved performance. Another reason may be that both SVR-Sp and ARIMA-Sp also suffer from missing data during the training stage, which results in less accurate predictions.

The results also illustrate that SVR is more robust than ARIMA when encountering missing values (i.e., ARIMA-Sp performs better than ARIMA, while the improvements of SVR-Sp over SVR is relatively marginal). This is because ARIMA is a linear model which mainly uses the weighted average of the previous readings for prediction, while SVR is a nonlinear model that utilizes a kernel function.

Figure 9C:
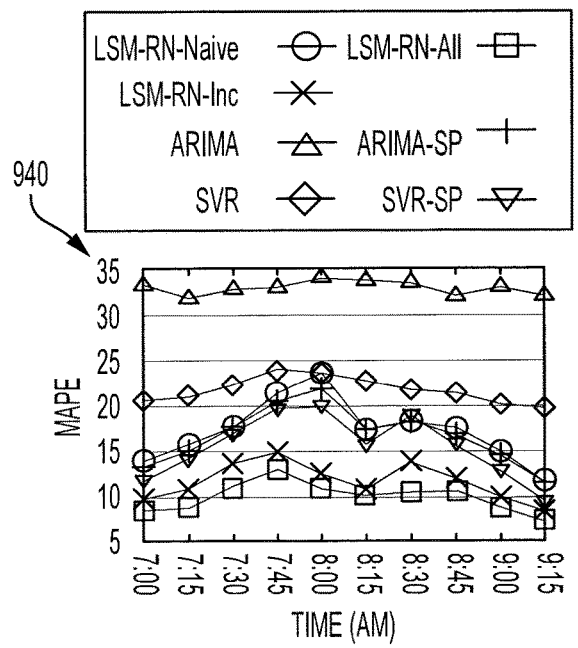
Figure 9D:
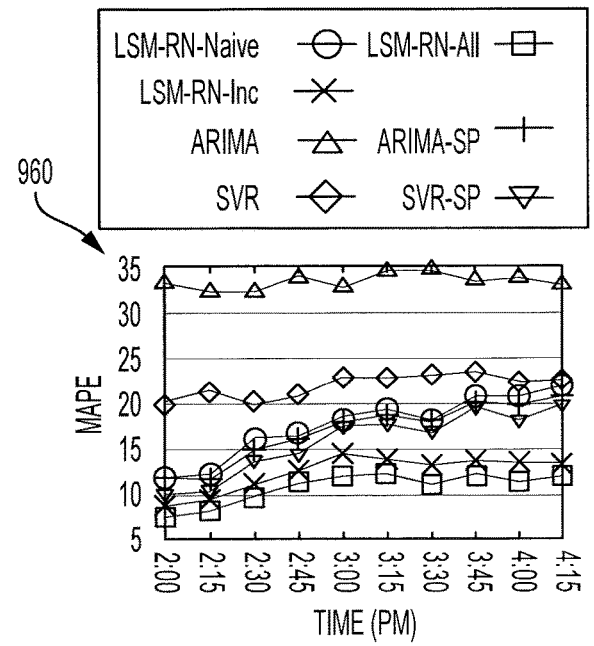

FIG. 9C illustrates results 940 of experimentation of the LARGE network during rush hour, and FIG. 9D illustrates results 960 of experimentation of the LARGE network during non-rush hour for predictions of 5 minutes in the future. The results 940 and the results 960 are similar to the results 900 and 920 of FIGS. 9A and 9B.

Figure 10A:
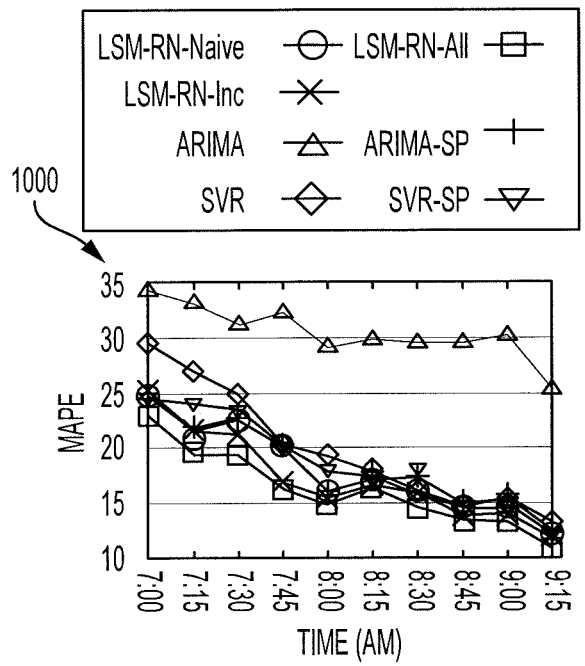
FIGS. 10A-10C are graphs illustrating prediction accuracy of various methods of predicting future traffic information for a relatively long prediction window according to an embodiment of the present disclosure.
Figure 10B:
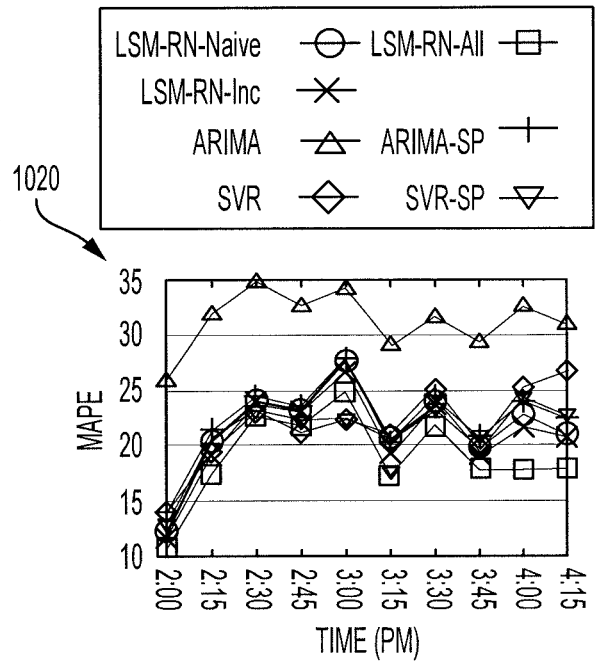

Experimental results will now be described for long-term predictions which correspond to predictions of traffic conditions for a point in time 30 minutes in the future (i.e., h=6). In particular, FIG. 10A illustrates results 1000 of experimentation of the SMALL network during rush hour, and FIG. 10B illustrates results 1020 of experimentation of the SMALL network during non-rush hour for predictions of 30 minutes in the future. As observed in FIGS. 10A and 10B, LSM-RN-All and LSM-RN-Inc still outperform the other methods, although the margin between these methods and the baseline methods is narrower than in FIGS. 9A and 9B. The reason for the reduced margin may be that when long-term predictions are made using LSM-RN-All and LSM-RN-Inc, predicted values from the past are used for future prediction. This leads to the issue of error accumulation (i.e., errors incurred in the past are propagated into future predictions).

Figure 10C:
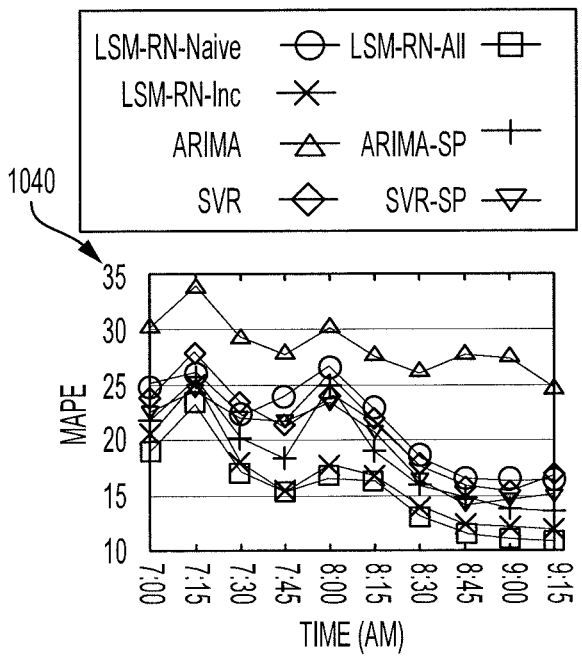
Figure 10D:
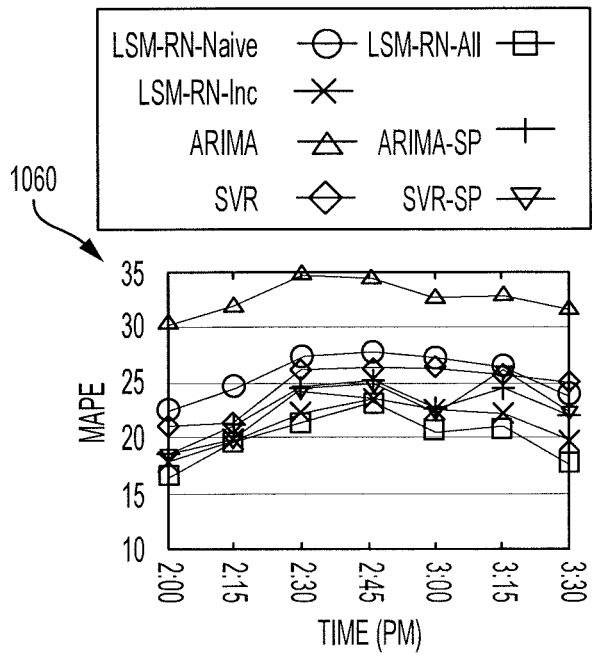

FIG. 10C illustrates results 1040 of experimentation of the LARGE network during rush hour, and FIG. 10D illustrates results 1060 of experimentation of the LARGE network during non-rush hour for predictions of 30 minutes in the future. The results 1040 and the results 1060 are similar to the results 1000 and 1020 of FIGS. 10A and 10B.

In another set of experiments, the completion accuracy of different methods was evaluated. The experiment results are only reported for the LARGE network, however, the results are similar for the SMALL network.

Figure 11A:
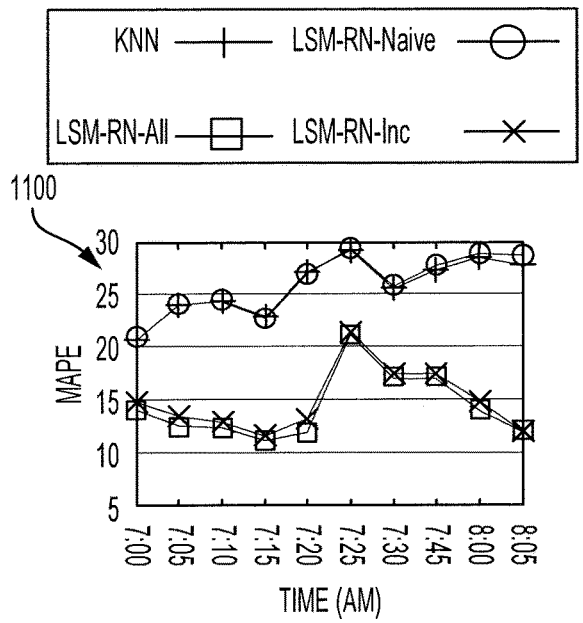
FIGS. 11A and 11B are graphs illustrating an accuracy of completing missing values corresponding to missing sensor data on a road network for various methods of predicting future traffic information according to an embodiment of the present disclosure.
Figure 11B:
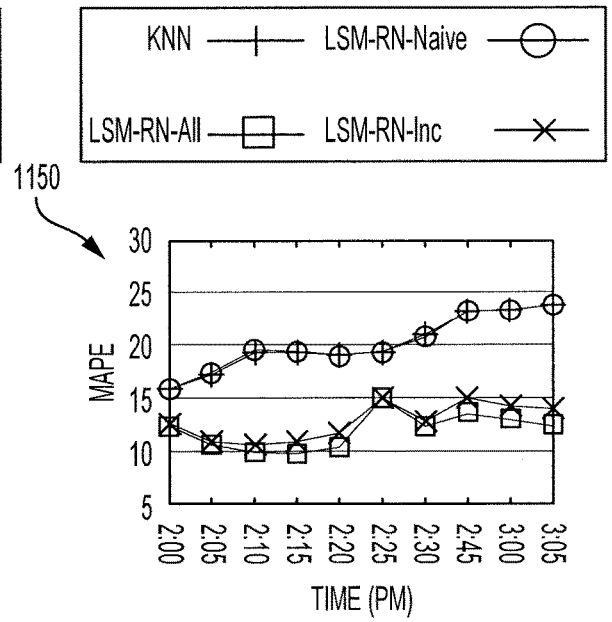

FIG. 11A illustrates completion accuracy 1100 of experimentation of the LARGE network during rush hour, and FIG. 11B illustrates completion accuracy 1150 of experimentation of the LARGE network during non-rush hour. It can be observed that both LSM-RN-All and LSM-RN-Inc achieve significantly fewer errors than that of other methods. This may be due to the fact that LSM-RN-All and LSM-RN-Inc capture both spatial relationships and temporal relationships, while LSM-RN-Naïve and KNN only use spatial relationships. LSM-RN-All performs better than LSM-RN-Inc by jointly inferring all of the latent attributes. On the other hand, LSM-RN-Naïve and KNN have similar performances, which are inferior to both LSM-RN-All and LSM-RN-Inc. These results also indicate that utilizing both spatial properties and temporal properties yields a greater gain than only utilizing spatial properties. It can be observed that the completion accuracy 1150 is greater during non-rush hour than the completion accuracy 1100 during rush hour. This may be due to the fact that traffic congestion is more dynamic during rush hour, and the underlying patterns and transitions change frequently.

Table 3 below illustrates running time of training and traffic prediction for the various algorithms. The training time is measured in seconds, while the prediction time is measured in milliseconds. The running times are measured for both the SMALL network and the LARGE network.

|  | SMALL | | LARGE | |
| --- | --- | --- | --- | --- |
| DATA | TRAIN (S) | PREDICT (MS) | TRAIN (S) | PREDICT (MS) |
| LSM-RN-Naïve | — | 1353 | — | 29,439 |
| LSM-RN-All | — | 869 | — | 14,247 |
| LSM-RN-Inc | — | 407 | — | 4145 |
| ARIMA | 484 | .00015 | 987 | .00024 |
| SVR | 47,420 | .00042 | 86,093.99 | .00051 |

Although ARIMA and SVR are relatively fast in each prediction, they both require a relatively large volume of training data and have a much greater training time, which may present issues for real-time systems. On the contrary, the LSM-RN methods efficiently train and predict simultaneously. It can be seen that LSM-RN-Inc provides the greatest efficiency; learning of the time-dependent latent attributes and predicting traffic information for each edge of the road network requires less than 500 milliseconds (ms). The greatest efficiency achieved by the LSM-RN-Inc method may be due to the fact that the incremental learning algorithms conditionally adjust the latent attributes of certain vertices, and also utilize the topological order that enables relatively fast convergence. The LSM-RN-Inc method can calculate predictions for the LARGE network in less than 5 seconds, which is acceptable considering the fact that the span between two snapshots is at least 5 minutes in practice. This demonstrates that LSM-RN-Inc scales well to relatively large road networks.

LSM-RN-Naïve and LSM-RN-All both require a longer running time than that of LSM-RN-Inc. Additionally, LSM-RN-All is faster than LSM-RN-Naïve. This may be due to the fact that LSM-RN-Naive independently runs the global learning algorithm for each snapshot T times, while LSM-RN-All only applies global learning for each snapshot one time.

Figure 12A:
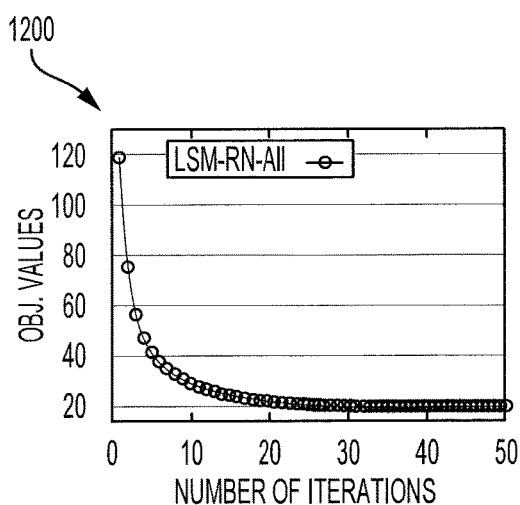
FIGS. 12A and 12B are graphs illustrating a convergence rate of an iterative traffic prediction algorithm according to an embodiment of the present disclosure.
Figure 12B:
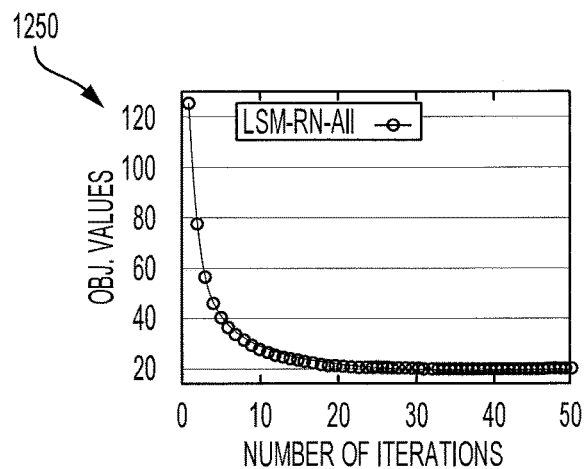

FIG. 12A illustrates convergence rates 1200 of the iterative algorithm LSM-RN-All on the data set of the SMALL network, and FIG. 12B illustrates convergence rates of the iterative algorithm LSM-RN-All on the data set of the LARGE network. As shown, LSM-RN-All converges relatively quickly. In particular, when the quantity of iterations is approximately 20, the algorithm tends to converge in terms of the objective value described above with reference to equation 4.

Figure 13A:
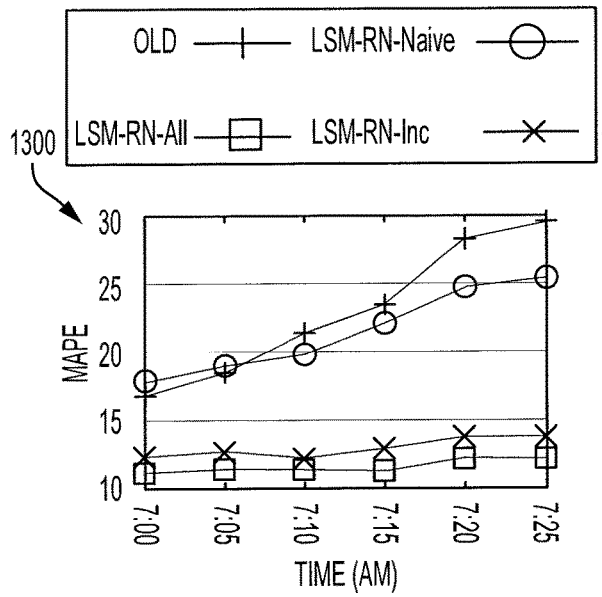
FIGS. 13A and 13B are graphs illustrating prediction accuracy of real-time forecasting using multiple methods for predicting future traffic information according to an embodiment of the present disclosure.
Figure 13B:
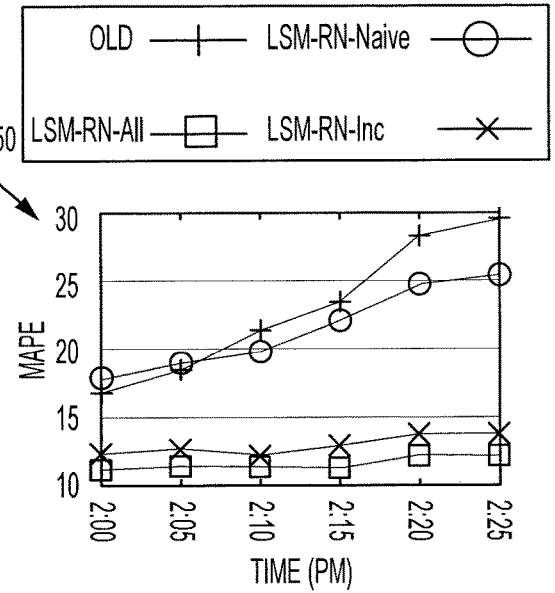

Another set of experiments was used to evaluate online setting algorithms. Results are only reported for the experiment results using the data set from the LARGE network. In particular, FIG. 13A illustrates accuracy 1300 of various prediction methods on the data set of the LARGE network, and FIG. 13B illustrates accuracy 1350 of various prediction methods on the data set of the LARGE network. As shown, LSM-RN-Inc and LSM-RN-All achieve similar accuracy. This may be due to the fact that LSM-RN-Inc effectively leverages real-time feedback to adjust the latent attributes.

LSM-RN-Inc performs significantly better than the Old method (which ignores the feedback information) and the LSM-RN-Naïve (which ignores the previous snapshots). It can be observed that fewer errors exist using Old than LSM-RN-Naïve at initial timestamps (i.e., 7:00 am and 7:05 am), whereas greater errors exist using Old than LSM-RN-Naïve for at later timestamps. This indicates that the latent attributes learned in the previous time window may be more liable for predicting near future traffic conditions, but may be less accurate for long-term predictions due to error accumulation.

Figure 14A:
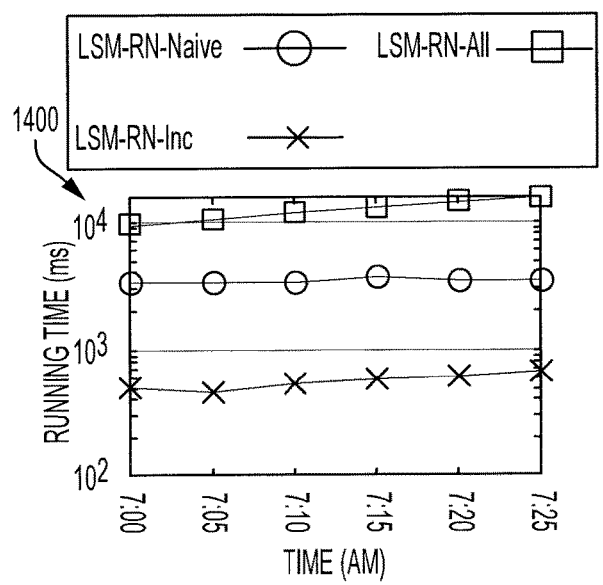
FIGS. 14A and 14B are graphs illustrating runtimes for predicting future traffic information using multiple methods for predicting the future traffic information according to an embodiment of the present disclosure.
Figure 14B:
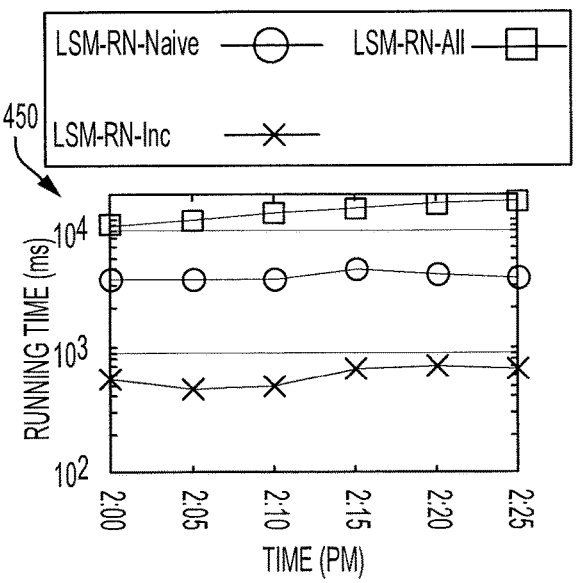

FIG. 14A illustrates running time 1400 of various prediction methods on the data set of the LARGE network, and FIG. 14B illustrates running time 1450 of various prediction methods on the data set of the LARGE network. It can be observed that LSM-RN-Inc is the most efficient approach and is on average twice as fast as LSM-RN-Naïve and one order of magnitude faster than LSM-RN-All. This may be due to the fact that LSM-RN-Inc performs a conditional latent attribute update for vertices within a small portion of the road network, whereas LSM-RN-Naïve and LSM-RN-All both re-compute the latent attributes from at least one entire road network snapshot. Because LSM-RN-All utilizes all of the up-to-date snapshots and LSM-RN-Naïve only considers the most recent snapshot and the real-time setting, LSM-RN-Naïve is faster than LSM-RN-All. It can be observed that LSM-RN-Inc takes less than one second to incorporate the real-time feedback information, while LSM-RN-Naïve and LSM-RN-All both require significantly longer.

Accordingly, it may be concluded that LSM-RN-Inc achieves a desirable trade-off between prediction accuracy and efficiency, which is applicable for real-time traffic prediction applications.

Experiments were next performed that evaluate the performance of the various methods by varying the parameters of the LSM-RN methodologies. The results are shown for only the data set of the SMALL network.

Figure 15A:
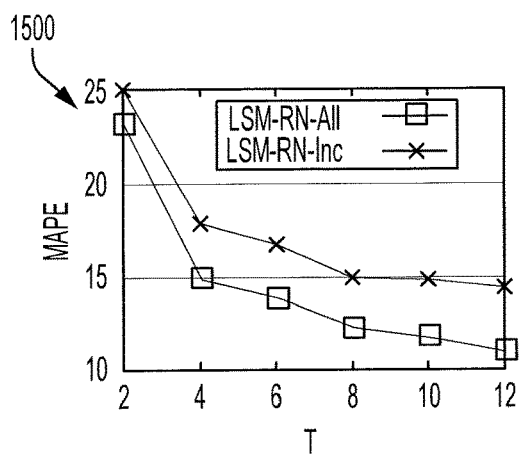
FIGS. 15A and 15B are graphs illustrating the effect of varying a parameter corresponding to a quantity of snapshots utilized in predicting future traffic information according to an embodiment of the present disclosure.
Figure 15B:
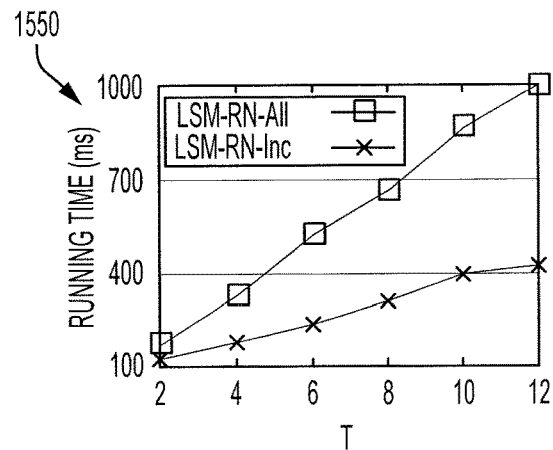

FIG. 15A illustrates changes to prediction performance 1500 by varying the variable T on the data set of the SMALL network, and FIG. 15B illustrates changes to running time 1550 by varying the variable T on the data set of the SMALL network. It can be observed that the prediction error rate decreases as more snapshots are utilized. In particular, the results improve significantly when T is increased from 2 to 6. However, the performance varies relatively little at values of T that are greater than or equal to 6. This indicates that fewer snapshots (i.e., 2 or less) are insufficient for capturing the traffic patterns and the evolving changes. On the other hand, more snapshots (i.e., more historical data) do not necessarily yield better gain, considering the running time increases with use of a greater quantity of snapshots. Therefore, it may be preferred to use between 6 and 12 snapshots to achieve a desirable trade-off between running time and prediction accuracy.

Figure 16A:
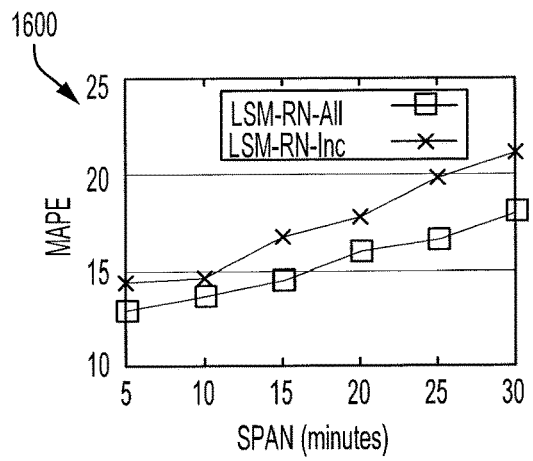
FIGS. 16A and 16B are graphs illustrating the effect of varying a parameter corresponding to a span used to learn latent attributes utilized in predicting future traffic information according to an embodiment of the present disclosure.
Figure 16B:
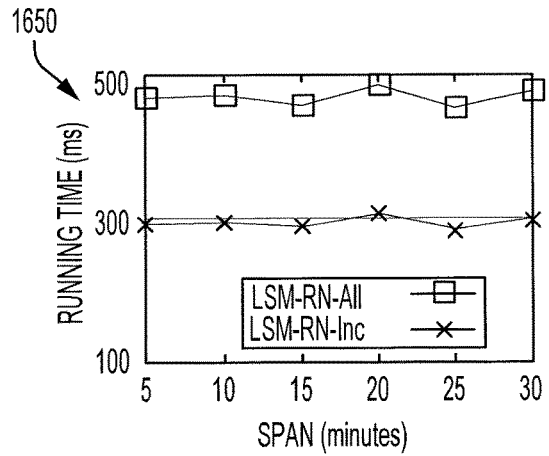

FIG. 16A illustrates changes to prediction performance 1600 by varying the variable span on the data set of the SMALL network, and FIG. 16B illustrates changes to running time 1650 by varying the variable span on the data set of the SMALL network. It can be seen that performance declines as the time gap between 2 snapshots increases. This may be due to the fact that when span increases, the evolving process of underlying traffic may not evolve smoothly, and the transition process learned in the previous snapshot may not be applicable for the future. Due to the relatively high resolution of the sensors used in the experiments, it may be preferable to use a smaller span to learn the latent attributes relative to sensors having a relatively low resolution. Additionally, it can be seen that span fails to significantly affect the running time of either algorithm.

Figure 17A:
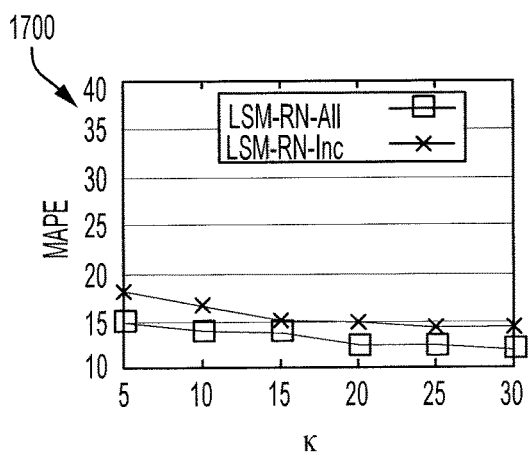
FIGS. 17A and 17B are graphs illustrating the effect of varying a first parameter corresponding to a quantity of dimensions and a second parameter corresponding to a regularization parameter of a method for predicting future traffic information according to an embodiment of the present disclosure.

FIG. 17A illustrates changes to prediction performance 1700 by varying the variable k on the data set of the SMALL network. It can be observed that better results are achieved by increasing the quantity of latent attributes. It can be further observed that the performance of the methods is stable when k is greater than or equal to 20. This may indicate that a relatively low-rank latent space representation is sufficient to capture the attributes of the traffic data.

Additionally, the results illustrate that when the quantity of latent attributes is relatively small (i.e., k is less than or equal to 30), the running time increases with k. However, the running time may only change insignificantly when k is varied between 5 and 30. Therefore, a value of 20 for k may provide a desirable balance between computational cost and accuracy.

Figure 17B:
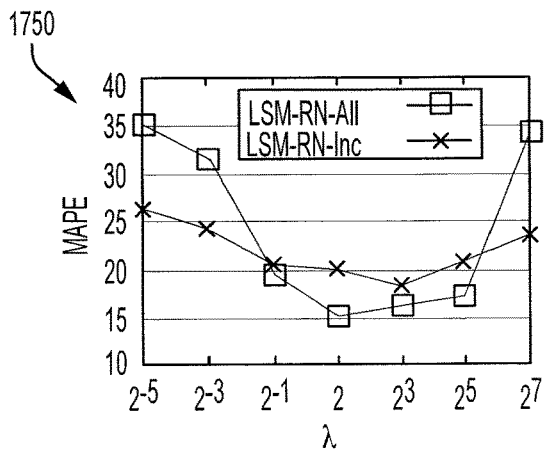

FIG. 17B illustrates changes to prediction performance 1750 by varying the variable λ on the data set of the SMALL network. λ represents the regularization parameter for the graph Laplacian dynamics. It can be observed that the graph Laplacian has a larger impact on the LSM-RN-All algorithm than on the LSM-RN-Inc algorithm. λ controls how the global structure similarity contributes to latent attributes and the fact that LSM-RN-All jointly learns those time-dependent latent attributes. Accordingly, this may explain why λ has a greater effect on the LSM-RN-All algorithm. In contrast, the LSM-RN-Inc algorithm adaptively updates the latent position of a relatively small quantity of changed vertices in a limited localized view, and thus is less sensitive to the global structure similarity than the LSM-RN-Inc algorithm. When using the LSM-RN-Inc All algorithm, a value of λ=2 may yield optimal results. Similarly, when using the LSM-RN-Inc algorithm, a value of λ=8 may yield optimal results.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for traffic prediction of a road network comprising:
    receiving, from a plurality of sensors, past traffic information corresponding to multiple locations on the road network;
    determining, by a processor and based on the past traffic information, temporal characteristics of the past traffic information corresponding to changes of characteristics of at least some of the multiple locations on the road network over time and spatial characteristics of the past traffic information corresponding to interactions between at least some of the multiple locations on the road network;
    predicting, by the processor, predicted traffic information corresponding to a later time based on the determined temporal characteristics of the past traffic information and the determined spatial characteristics of the past traffic information;
    receiving, from the plurality of sensors, detected additional traffic information corresponding to the later time for at least some of the multiple locations on the road network; and
    updating, by the processor, the temporal characteristics of the traffic information and the spatial characteristics of the traffic information based on the predicted traffic information and the detected additional traffic information,
    wherein updating the temporal characteristics of the traffic information and the spatial characteristics of the traffic information based on the predicted traffic information and the detected additional traffic information is performed using a combination of global learning and incremental learning,
    wherein incremental learning comprises updating the temporal characteristics and the spatial characteristics based on the predicted traffic information and the detected additional traffic information for a subset of the multiple locations on the road network periodically across a first time window, and
    wherein global learning comprises updating the temporal characteristics and the spatial characteristics based on the predicted traffic information and the detected additional traffic information for the multiple locations on the road network at a conclusion of the first time window.

2. The method of claim 1 wherein receiving the past traffic information further includes receiving at least one of a vehicle speed or a vehicle density for at least some of the multiple locations at multiple time intervals.

3. The method of claim 1 wherein each of the plurality of sensors includes a traffic loop sensor configured to detect a vehicle speed and a vehicle density over a particular segment of a road.

4. The method of claim 1 further comprising representing the road network via a plurality of vertices each corresponding to an intersection or an end of a road and a plurality of edges interconnecting each of the plurality of vertices and wherein the past or current traffic information includes a vehicle speed along an edge.

5. The method of claim 1 further comprising predicting, by the processor, additional predicted traffic information corresponding to traffic information at locations other than locations associated with sensors based on the determined temporal characteristics of the past traffic information and the determined spatial characteristics of the past traffic information.

6. The method of claim 1 wherein the road network is modeled using a first matrix to represent the temporal characteristics of the past traffic information and a second matrix to represent the spatial characteristics of the past traffic information.

7. The method of claim 6 wherein predicting the predicted traffic information includes performing matrix operations using the first matrix and the second matrix.

8. The method of claim 6 wherein updating the temporal characteristics of the traffic information and the spatial characteristics of the traffic information includes performing matrix operations using the first matrix and the second matrix.

9. The method of claim 1 further comprising determining, by the processor, aggregated past traffic information by averaging the past traffic information over a predetermined time interval for each of the plurality of sensors, wherein determining the temporal characteristics and the spatial characteristics is based on the aggregated past traffic information.

10. The method of claim 1 further comprising:
    receiving, by a navigation processor of a navigation server, a route request from a navigation interface provider including a starting location and a destination;
    receiving, by the navigation processor, the predicted traffic information;

determining, by the navigation processor, a route from the starting location to the destination based on the predicted traffic information; and transmitting, by the navigation processor, the route to the navigation interface provider.

11. The method of claim 10 further comprising outputting, by the navigation interface provider, navigation instructions corresponding to the route.

12. A system for predicting traffic of a road network, the system comprising:
a plurality of sensors positioned at multiple locations on the road network and configured to detect past traffic information;
a network access device configured to receive the past traffic information from the plurality of sensors; and
a prediction processor coupled to the network access device and configured to:
determine temporal characteristics of the past traffic information corresponding to changes of characteristics of at least some of the multiple locations on the road network over time and spatial characteristics of the past traffic information corresponding to interactions between at least some of the multiple locations on the road network,
predict predicted traffic information corresponding to a later time based on the determined temporal characteristics of the past traffic information and the determined spatial characteristics of the past traffic information,
receive detected additional traffic information corresponding to the later time for at least some of the multiple locations on the road network, and
update the temporal characteristics of the traffic information and the spatial characteristics of the traffic information based on the predicted traffic information and the detected additional traffic information,
wherein the prediction processor is further configured to update the temporal characteristics of the traffic information and the spatial characteristics of the traffic information based on the predicted traffic information and the detected additional traffic information by using a combination of global learning and incremental learning,
wherein incremental learning comprises updating the temporal characteristics and the spatial characteristics based on the predicted traffic information and the detected additional traffic information for a subset of the multiple locations on the road network periodically across a first time window, and
wherein global learning comprises updating the temporal characteristics and the spatial characteristics based on the predicted traffic information and the detected additional traffic information for the multiple locations on the road network at a conclusion of the first time window.

13. The system of claim 12 wherein each of the plurality of sensors includes at least one of a traffic loop sensor, an optical sensor, a camera, a line of sight sensor, or a global positioning system (GPS) sensor and is configured to detect at least one of a volume of vehicles, an occupancy of the vehicles, or a speed of the vehicles.

14. The system of claim 12 wherein the prediction processor is further configured to predict additional predicted traffic information corresponding to traffic information at locations other than locations associated with sensors based on the determined temporal characteristics of the past traffic information and the determined spatial characteristics of the past traffic information.

15. The system of claim 12 further comprising a navigation server having a navigation network access device configured to communicate with the prediction processor, and a navigation processor configured to:
receive a route request from a navigation interface provider including a starting location and a destination via the network access device;
receive the predicted traffic information from the prediction processor via the network access device;
determine a route from the starting location to the destination based on the predicted traffic information; and
transmit the route to the navigation interface provider.

16. The system of claim 15 further comprising the navigation interface provider having an input device configured to receive the starting location and the destination and an output device configured to output navigation instructions corresponding to the route.

17. A method for traffic prediction of a road network comprising:
receiving, from a plurality of sensors, past traffic information corresponding to multiple locations on the road network;
determining, by a processor and based on the past traffic information, temporal characteristics of the past traffic information corresponding to changes of characteristics of at least some of the multiple locations on the road network over time, and spatial characteristics of the past traffic information corresponding to interactions between at least some of the multiple locations on the road network;
predicting, by the processor, predicted traffic information corresponding to traffic information at locations other than those associated with sensors at a later time based on the determined temporal characteristics of the past traffic information and the determined spatial characteristics of the past traffic information by performing matrix operations;
receiving, from the plurality of sensors, detected additional traffic information corresponding to the later time for at least some of the multiple locations on the road network; and
updating, by the processor, the temporal characteristics of the traffic information and the spatial characteristics of the traffic information based on the predicted traffic information and the detected additional traffic information,
wherein updating the temporal characteristics of the traffic information and the spatial characteristics of the traffic information based on the predicted traffic information and the detected additional traffic information is performed using a combination of global learning and incremental learning,
wherein incremental learning comprises updating the temporal characteristics and the spatial characteristics based on the predicted traffic information and the detected additional traffic information for a subset of the multiple locations on the road network periodically across a first time window, and
wherein global learning comprises updating the temporal characteristics and the spatial characteristics based on the predicted traffic information and the detected additional traffic information for the multiple locations on the road network at a conclusion of the first time window.

* * * * *